(12) United States Patent
Stals et al.

(10) Patent No.: US 8,332,323 B2
(45) Date of Patent: Dec. 11, 2012

(54) SERVER DEVICE FOR CONTROLLING A TRANSACTION, FIRST ENTITY AND SECOND ENTITY

(75) Inventors: Luc Stals, Duesseldorf (DE); Martin Palzer, Ruedesheim am Rhein (DE); Martin Geldermann, Linsengericht (DE); Shinji Hirasawa, Chiryu (JP)

(73) Assignee: Mr. QR10 GmbH & Co. Kg., Flensburg (DE)

( * ) Notice: Subject to any disclaimer, the term of this patent is extended or adjusted under 35 U.S.C. 154(b) by 0 days.

(21) Appl. No.: 12/956,874

(22) Filed: Nov. 30, 2010

(65) Prior Publication Data
US 2011/0137797 A1  Jun. 9, 2011

Related U.S. Application Data

(63) Continuation of application No. PCT/EP2009/003742, filed on May 26, 2009.

(30) Foreign Application Priority Data

| May 30, 2008 | (EP) | 08009982 |
| Sep. 19, 2008 | (EP) | 08016587 |
| Dec. 4, 2008 | (EP) | 08021085 |

(51) Int. Cl.
*G06Q 40/00* (2006.01)

(52) U.S. Cl. ........ 705/44; 705/39; 705/40; 705/41; 705/42; 705/64; 713/158; 235/379; 370/401

(58) Field of Classification Search .......... 705/39–42, 705/44, 64; 713/158; 235/379; 370/401
See application file for complete search history.

(56) References Cited

U.S. PATENT DOCUMENTS

| 2003/0126080 A1* | 7/2003 | Ogmen ............... 705/40 |
| 2006/0006223 A1 | 1/2006 | Harris |
| 2008/0170579 A1* | 7/2008 | Chafle et al. ........ 370/401 |
| 2008/0208736 A1* | 8/2008 | Iversen ............... 705/39 |

FOREIGN PATENT DOCUMENTS

| EP | 1016999 A2 | 7/2000 |
| EP | 1513120 A2 | 3/2005 |
| JP | 2003-141433 | 5/2003 |
| WO | WO 95-12859 | 5/1995 |
| WO | WO2004-090825 | 10/2004 |

* cited by examiner

*Primary Examiner* — Harish T. Dass
(74) *Attorney, Agent, or Firm* — Glenn Patent Group

(57) ABSTRACT

Server device for performing a transaction in a system having a first entity, such as a POS, a second entity, such as a user having a mobile phone with a digital camera, and a remote server. The first entity generates a code having a transaction information and sends a first message to a server. The second entity, such as a buyer of a product or a user of a service captures the code and transmits a second message to the server having information on the transaction extracted from the code. The transaction is only authorized, when the server has determined that the first message and the second message match with each other. The transaction can be a payment transfer, a grant of an access to a service or a grant of an access to an internet portal.

7 Claims, 15 Drawing Sheets

First entity (e.g. POS)

Server

Second entity
(e.g. mobile phone with digital camera)

| application type | transaction | transaction information |
|---|---|---|
| 1. Online Payment | payment process to transfer/guarantee payment to $1^{st}$ entity | TR-ID, POS-ID item, price |
| 2. Cash Redraw | debiting the drawn amount and/or handing out money | TR-ID, CashTerminal-ID, amount required |
| 3. Receipt Payment | payment process to transfer/guarantee payment to $1^{st}$ entity | IR-ID, POS-ID amount |
| 4. CND (Card Not Present) Applications | payment process to transfer/guarantee payment to $1^{st}$ entity | TR-ID, ID of selling party, item, price |
| 5. Mobilo to Mobile Payment | payment process to transfer/guarantee payment to $1^{st}$ entity | TR-ID, ID of buying/taking entity price/amount |
| 6. Authorization | $2^{nd}$ entity can access a service provided by a $1^{st}$ entity (online portal) | TR-ID, ID of $1^{st}$ entity |

FIGURE 5

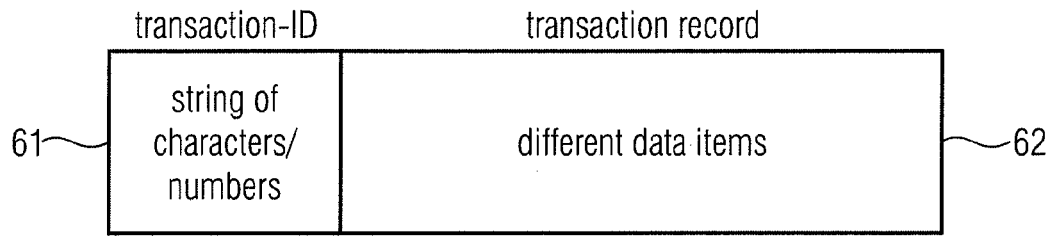

transaction record can be
- included in the auto-ID code
- separately sent to 2$^{nd}$ entity from 1$^{st}$ entity
- separately sent to server from 1$^{st}$ entity
  (together with transaction ID)

FIGURE 6A

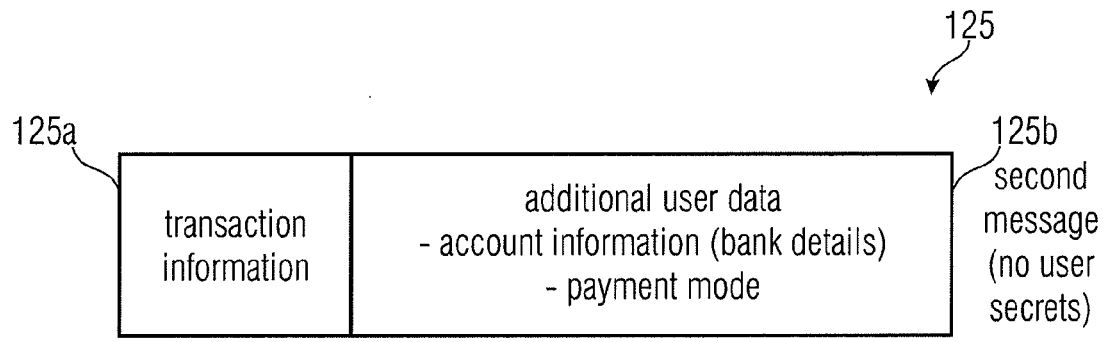

- user does not have to give personal data to 1$^{st}$ entity (evan name is not necessary)

- user provides his secrets only to his own device (secrets do not arrive at 1$^{st}$ entity or server)

- one-way-communication for capturing ID code and, specifically, matching of messages create high confidence by the user

FIGURE 6B

SERVER DEVICE FOR CONTROLLING A TRANSACTION, FIRST ENTITY AND SECOND ENTITY

CROSS-REFERENCE TO RELATED APPLICATIONS

This application is a continuation of copending International Application No. PCT/EP2009/003742, filed May 26, 2009, which is incorporated herein by reference in its entirety, and additionally claims priority from European Applications Nos. EP 08 009 982.3, filed May 30, 2008, EP 08 016 587.1, filed Sep. 19, 2008 and EP 08 021 085.9, filed Dec. 4, 2008, which are all incorporated herein by reference in their entirety.

BACKGROUND OF THE INVENTION

The present invention is related to the processing of electronic transactions and, particularly, transactions for payment or authorization purposes.

Electronic shopping systems for allowing a shopper to purchase products without necessarily having to travel to a store are well known. An example of a contemporary electronic shopping system is a cable television shopping channel wherein products are advertised on television. A shopper merely watches the television and when an item is shown for which a purchase is desired, the shopper uses a telephone to call an agent of the seller to place an order for the desired product. Usually, a credit card number is given over telephone to facilitate payment for the purchased item. The purchased product is then shipped directly to the buyer.

There also exist interactive or bi-directional cable systems, allowing the purchaser to make selections directly from the television screen.

EP 1016999 A2 discloses an electronic shopping system which facilitates purchase transactions via a wireless telephone. The purchase transaction program is downloaded from the seller's server to the purchaser's wireless telephone via a program loader contained within the purchaser's wireless telephone. The purchase transaction program is stored in the program memory of the purchaser's wireless telephone. The purchase transaction program is used by the purchaser to facilitate the selection of items to be purchased as well as payment therefore. An external barcode reader is attached to the wireless telephone to facilitate the selection of items to be purchased and is controlled via the downloaded purchase transaction program.

JP 2003 141433 discloses a settlement method and a system having server device, an information terminal, an information processing method and a program therefore. The information on the purchase price of a commodity, an account for payment and the like are displayed on the first information terminal by a two-dimensional code. A user picks up an image of the two-dimensional code by a camera part mounted on a second information terminal, and the information of the two-dimensional code is transmitted to a settlement agency server from the second information terminal, whereby the purchase of the commodity by the user himself or herself can be confirmed and the settlement is executed.

EP 1513120 A2 discloses a method of initiating a payment process for products and the system for performing the payment process. A seller registers with an external device. A buyer has a mobile phone on which a program is installed which automatically performs steps of a payment process. The mobile phone furthermore comprises a digital camera and is in the position to build up an internet connection. The buyer has stored on the mobile phone several data required for the payment process which are PINs and TANs as well as one or more credit card numbers and the corresponding security codes. As soon as the buyer places an order, the seller automatically requires a transaction item from the external device. The seller transmits the payment amount as well as the seller identification to the external device. The external device generates a unique alpha-numeric transaction identification and transmits this transaction identification to the seller. Based on this transaction identification, the seller automatically generates an optical code to be displayed. The buyer photographs the optical code and extracts the transaction identification from the code and transmits this transaction identification to the external device. The external device checks whether the transmitted transaction identification is cleared. To this end, the external device compares the transmitted transaction identification with the database having valid transaction identifications which were sent to the seller earlier. When a valid transaction identification is located in the database, corresponding data relevant for the payment process are taken from the database and the transaction identification is removed from the database. Then, the external device transmits, via the internet, the amount to be paid and additional parameters to the mobile phone. Then, the seller clears the payment by an acknowledgement action. Then, the mobile phone automatically transmits an acknowledgement indication as well as data indicating how the payment is to be processed and the mobile phone additionally transmits a credit card number and bank data to the external device. The external device triggers the money transfer or a credit card debit action and, when the payment process was successfully completed, a confirmation is transmitted at least to the selling party, so that the selling party can hand out the purchased product. Then, the internet connection of the mobile phone is terminated.

Generally, such payment processes suffer from security problems on the one hand and convenience problems on the other hand. In typical applications, there has to be a trade-off between security on the one hand and convenience on the other hand. An extremely secure process is not likely to be spread in the consumer community, when it is extremely inconvenient for users. Then, any security advantages of such process will not convince the users to use this process, since it is simply too uncomfortable and too complicated. On the other hand, an extremely easy and straightforward process, which is very convenient for the user, will also not gain widespread acceptance, if the security of this process is heavily discussed.

Therefore, a useful process has to be safe, but has to be convenient for the user, and any inconveniences as far as they are required for ascertaining security have to be hidden as much as possible from the user. It is, in addition, believed that, when inconveniences are distributed to the seller, this will be more acceptable compared to when the inconveniences are placed upon the buyers. This is simply due to the fact that the buyers pay the money and, therefore, have a high power and, finally, decide whether a certain payment/authorization process finds acceptance or not.

SUMMARY

According to an embodiment, a server device for controlling a transaction between the first entity and the second entity may have: a receiver for receiving a first message from the first entity, the first message having first information related to the transaction, and a second message from the second entity, the second message having second information related to the transaction; a matcher for checking whether the first information in the first message and the second information in the second message have a predetermined relation to each other; and an output interface for authorizing the transaction, when the first information and the second information have a predetermined relation and for rejecting the transaction, when the first information and the second information do not have the predetermined relation to each other.

According to another embodiment, a first entity for performing a transaction with a second entity under control of a server device may have: a transaction information generator for generating an information on the transaction; an identification code generator for generating and outputting an identification code, the identification code having the information on the transaction; a message transmitter for transmitting a message to the server, the message having the information on the transaction; and a confirmation receiver for receiving, from the server, an authorization indication.

According to another embodiment, a second entity for performing a transaction with a first entity under control of a server device may have: an identification code receiver for receiving an identification code generated and output by the first entity, the identification code having encoded information on the transaction; an information provider for providing the information on the transaction included in the identification code; a message transmitter for transmitting a message to the server, the message having the information on the transaction; and a confirmation receiver for receiving, from the server, a confirmation message indicating that the message has a predetermined relation to a different message received, by the server, from the first entity.

According to another embodiment, a method, performed in a server device, for controlling a transaction between the first entity and the second entity may have the steps of: receiving a first message from the first entity, the first message having first information related to the transaction, and a second message from the second entity, the second message having second information related to the transaction; checking whether the first information in the first message and the second information in the second message have a predetermined relation to each other; and authorizing the transaction, when the first information and the second information have a predetermined relation and for rejecting the transaction, when the first information and the second information do not have the predetermined relation to each other.

According to another embodiment, a method, performed in a first entity, for performing a transaction with a second entity under control of a server device may have the steps of: generating an information on the transaction; generating and outputting an identification code, the identification code having the information on the transaction; transmitting a message to the server, the message having the information on the transaction; and receiving, from the server, an authorization indication.

According to another embodiment, a method, performed in a second entity, for performing a transaction with a first entity under control of a server device may have the steps of: receiving an identification code generated and output by the first entity, the identification code having encoded information on the transaction; providing the information on the transaction included in the identification code; transmitting a message to the server, the message having the information on the transaction; and receiving, from the server, a confirmation message indicating that the message has a predetermined relation to a different message received, by the server, from the first entity.

Another embodiment may have a computer program for performing, when running on a computer, a method, performed in a server device, a first entity and a second entity as mentioned above.

The present invention is based on the finding that for a safe, but still convenient transaction process, three parties are needed. These parties are a first entity, which can, for example, be the selling entity or POS (Point of Service or Point of Sale). The second entity can be the mobile phone or, generally an electronic device of e.g. a buyer who wants to buy a product and has to pay for that product. The third entity will be a server device which communicates with the first entity, the second entity and probably to a payment company, or, alternatively, the server device is located in the payment company. Alternatively, for authorization purposes, the first entity can be an online portal providing any service. The second entity can be a user who wishes to access this online portal to obtain a certain service, and the third entity will be an authorization server who, in the end, instructs the online portal to accept the user or to reject the user. Advantageously, all entities, i.e., the server, the first entity and the second entity are electronic devices.

A security feature is that the user will not hand out secret data such as passwords or PINs to the first entity, i.e., the online portal or a POS. Instead, the user will keep this secret data and will need this secret data only for authorizing herself or himself to her or his electronic device such as a mobile phone or optional to the third entity.

Advantageously via a one-way (Auto-ID) communication, such as taking a photograph or receiving a near-field communication transmission, transaction information generated by the first entity is acquired by the second entity. The first entity, sends this transaction information in the form of a code, where the code can be an optical display, an electro-magnetic transmission, an audio transmission or any other way of Auto-ID transmission. The transmission of the codes in a visual audio or electro-magnetic appearance is triggered by the user, where the user will not provide any secret data for triggering the issuance of the code.

However, the first entity as well as the second entity will both transmit a message to the server device reporting that a code has been generated by the first entity and acquired by the second entity, where each transmission includes transaction information such as transaction identification or any other information which allows to identify a specific intended transaction. Thus, the server will receive two messages from different locations which relate to the same transaction. Only when the server receives both messages or finds out after a check of both messages, that both messages are in a predetermined relationship with each other, such as match with each other, any further action performed by the server is initiated.

When the server determines that there do not exist matching messages, then the server will, for example, terminate the complete further procedure in order to make sure that any possible attacks on the system are useless. This security check is convenient for the user since the additional transmission from the selling authority to the server has to be performed by the selling party and not by the user, so that the user does not need to undergo any uncomfortable actions.

Another feature contributing to the user's convenience is that as soon as the user triggers the selling party to buy anything or to access a service, the selling party can immediately reply due to the fact that the transaction information is directly generated in the selling party and does not originate in any external server. Thus, as soon as the user indicates to the selling party that the user is interested in a product or a service, the selling party can immediately reply by generating the identification code, which includes the transaction information actually generated by the selling party.

This feature contributes to the convenience for the user since the user does not have to wait for a lengthy communication between the selling party and a central server. Instead, as soon as the user shows an interest in a product or a service, the immediate reply of the selling party is the generation of an identification code.

At that point in time, the server device is not aware of any offer provided by the selling entity. This, however, is not a problem, but is a useful feature. In the case, in which the user decides to not accept the offer, i.e. to not receive the identification code, nothing happens anymore and, more importantly, there is no need that any additional steps or communications have to happen. When, however, the selling party would not have generated the transaction information, but would have retrieved the transaction information from the server, there would have been an additional communication/mechanism in which the selling party would have to inform the server that the transaction was stopped in a very early stage. When, however, the transaction information is generated by the selling party itself, any such communication is not needed, since the server is not aware of anything and does not have to be aware of anything, in case the user decides not to receive the identification code.

The feature contributing to the security of the inventive process is that, as soon as the user has received the identification code, and has decided to purchase a product or to access a service, the user will transmit a message to the server. The server will check whether an information included in this message has a predetermined relation to an information included in the different message received from the selling party. This matching can be based on the transaction information, where the transaction information can be an ID number for the transaction generated by the selling party or an identification of the selling party, which is included in the message from the selling party and in the message of the buying party or can be a time-stamp or any other information based on which an identification of a transaction is available. Other information can be an indication of the desired product and a price indicated for this product or simply a serial number of the identification code generated by the selling party and photographed by the receiving party. In the latter case, the serial number of the identification code would be the transaction information.

Only when this matching operation results in a positive outcome, any further steps such as providing an access to a service or further processing a payment procedure or any other transactions are allowed. This makes sure that the security check at an early stage of a more or less complicated procedure is performed and, specifically that a security check is performed before any sensitive payment details have to be transmitted to any entity.

The address for the server, to which the buying party has to send its message can be included in the identification code indicated by the selling party or, alternatively, can be fixedly programmed into a software application running on the user device, such as a mobile phone or any other mobile communication device. In the latter case, a further security feature is obtained due to the fact that any potential attack initiated by including a wrong server address into the identification code are moot from the very beginning.

There can be a registration process where the user registers herself or himself at the server device with a unique number, such as the number of a passport document and/or the mobile service device number, which combines an identification number of an SIM card and a serial number of the actual mobile phone. In this implementation, the server stores, in association to the unique number, any payment details, such as bank data, credit card number, etc. Since the process of transmitting this information to the server takes place when the user installs the software on her or his mobile phone, any such sensitive information never has to be transmitted in the context of a buying process. Since this communication only has to take place once and at any available time or via any available channel, a secure transmission can easily be provided for this message, since the message transfer can even be a transmission via registered letter or—generally—in a non electronic way.

Furthermore, the selling party never receives any such information and can, therefore, not store such information, and the only party having this information is the trusted server device. In another implementation, the user can transmit the bank detail information in his message to the server or in a subsequent message after the server has performed the message matching. In this case, the server does not have to store this sensitive data, but has to only forward this data to a bank or an online payment institute. When this message containing bank details is encrypted using a secret only known to the user and her or his bank, then even the server will not be able to read these bank details and the only party being able to read the bank details is the bank itself.

Importantly, however, the user never has to provide his real secrets such as her or his password to anybody. Instead, the only device needing the password or personal identification number (PIN) from the user is the user's mobile device itself. Therefore, the user only has to input his personal secrets into a device which is owned and controlled by the user herself or himself and the user does not have to input her or his secret into any device for which the user does not know anything by sure but only has to trust the device such as a POS device or a cash redraw machine or even any website.

BRIEF DESCRIPTION OF THE DRAWINGS

Embodiments of the present invention are subsequently explained with respect to the enclosed drawings, in which:

FIG. 5 is a table illustrating six different exemplary applications of the inventive concept;

FIG. 6a illustrates an overview over the transaction information, where the transaction information may comprise a transaction ID and a transaction record;

FIG. 6b illustrates an implementation of the second message having transaction information and additional user data;

FIG. 8 illustrates an overview over options in the scenario of FIG. 7a;

DETAILED DESCRIPTION OF THE INVENTION

Figure 7A:
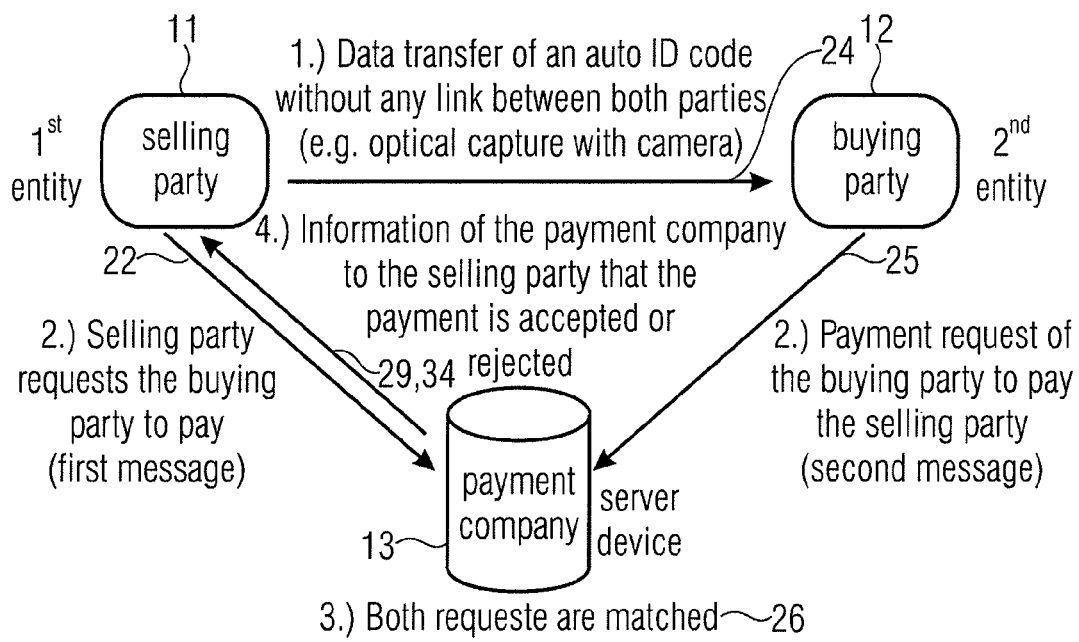
FIG. 7a illustrates an overview over an embodiment where the transaction is a payment process.

FIG. 7a illustrates an overview over the inventive scenario having a first entity 11, a second entity 12 and a third entity 13 which is the server device. Advantageously, all three entities 11, 12, 13 are logically separated and/or locally separated entities. Depending on the application of the inventive process, the first entity can be a selling party such as a POS (point of service/sale), the second entity can be a buying party, i.e., a "user" having a mobile phone which represents the second entity, and the third entity can be a payment company or, generally, a server device which is included in the payment company or which is in the position to securely communicate to a payment company such as a bank or a credit card institute or a certain payment company such as PayPal or any other such entity.

These three entities perform a specific communication in order to implement a secure transaction. Subsequently, a sequence of message in accordance with an embodiment is described in the context of FIG. 1a. In a first step 20, the second entity contacts the first entity. This step may, for example, be a straightforward message to the first entity which can, for example, be a point of sale, and the user states that the user is interested to buy a product or to have a service. Importantly, this step does not require that the second entity hands out any secret or personal data to the POS. This first "triggering" step 20 even does not require that the second entity hands out her or his name or identification.

In response to step 20, the first entity creates transaction information as indicated at 21. This transaction information can include any kind of information identifying a transaction which finally has to be performed. The transaction information can be a transaction identification, a description of the second entity and/or the first entity, a description of the product or service in question, a description of the price in question, time stamps etc. Subsequent to generating the transaction information in step 21, the first entity transmits the first message having the transaction information to the server as indicated at step 22. Furthermore, the first entity generates an identification code having the transaction information as indicated at 23.

The order of steps 22 and 23 can be reversed and there can be a certain time distance between generating the identification code and transmitting the first message to the server so that the transmission of the first message to the server takes place a certain time subsequent to the generation of the identification code. Furthermore, the transmission of the first message to the server can depend on a further condition so that the first entity receives knowledge whether the second entity actually has transmitted a message to the server or whether the second entity although triggering the first entity in step 20 has stopped the whole procedure due to a lack of interest into the offered product or service.

In step 24, the second entity receives the code from the first entity via an advantageously one-way communication and extracts the transaction information from the code. Step 24 may be implemented by taking a photograph of the identification code generated and displayed by the first entity. Alternatively, however, the identification code can also be an RF transmission using for example a near field communication technology or can be an audio transmission in the audible or inaudible range from the POS to the user. This transmission can also be the transmission of an email or even the handing out of a piece of paper on which the identification code is printed and which the user can then analyze via a digital camera or a scanner.

Subsequent to the extraction of the transaction information from the identification code in step 24, the second entity transmits a second message to the server as indicated at 25, where the second message transmitted to the server comprises the transaction information and, maybe additional information as will be discussed later on. In step 26, the server matches both messages such as by using time stamps, a time counter, an ID matching or any other way of validating two messages in order to check, whether these messages or information contained in these messages have a predetermined relation to each other. When step 26 results in a negative outcome, i.e., when the check has revealed that the information in the two messages do not have a predetermined relation to each other or only one of the two messages has arrived the server, a no match result is output at 27. The action taken in response to a no match result can be any of actually transmitting a transaction rejected message to the first entity and/or the second entity or simply interrupting the further procedure without providing any further indication or can even be an information to the police or similar authorities in case of a suspected criminal abuse.

When, however, step 26 has resulted in a positive outcome, i.e., a match OK result 28, the transaction identified by the transaction information is authorized in step 29. Step 29 can result in an actual message to the first and/or the second entity that the transaction is authorized, but can, alternatively or additionally result in a further communication scenario as, for example, illustrated in FIG. 1b. Subsequent to a match OK result, the server may extract bank details of the second entity in step 30 either from a server-stored database or the second message from the second entity or an additional message received from the second entity. Depending on the bank details extracted, the server may contact a payment company in step 31, and the server may trigger a money transfer from the second entity to the first entity in step 32. In case of a positive outcome of step 32, the server receives money transfer confirmation or any other clearing message indicating that a money transfer can be definitely expected. Subsequent to the reception of such a confirmation or clearing message in step 33, the server can send a confirmation to the first and/or the second entity in step 34 that everything was OK, and the money transfer transaction has successfully been completed. Then, based on this message received from the server subsequent to step 34, the first entity can finally handout the product or allow an access to a service or can perform any other action which has been paid by the money transfer triggered by the server in step 32.

Figure 1A:
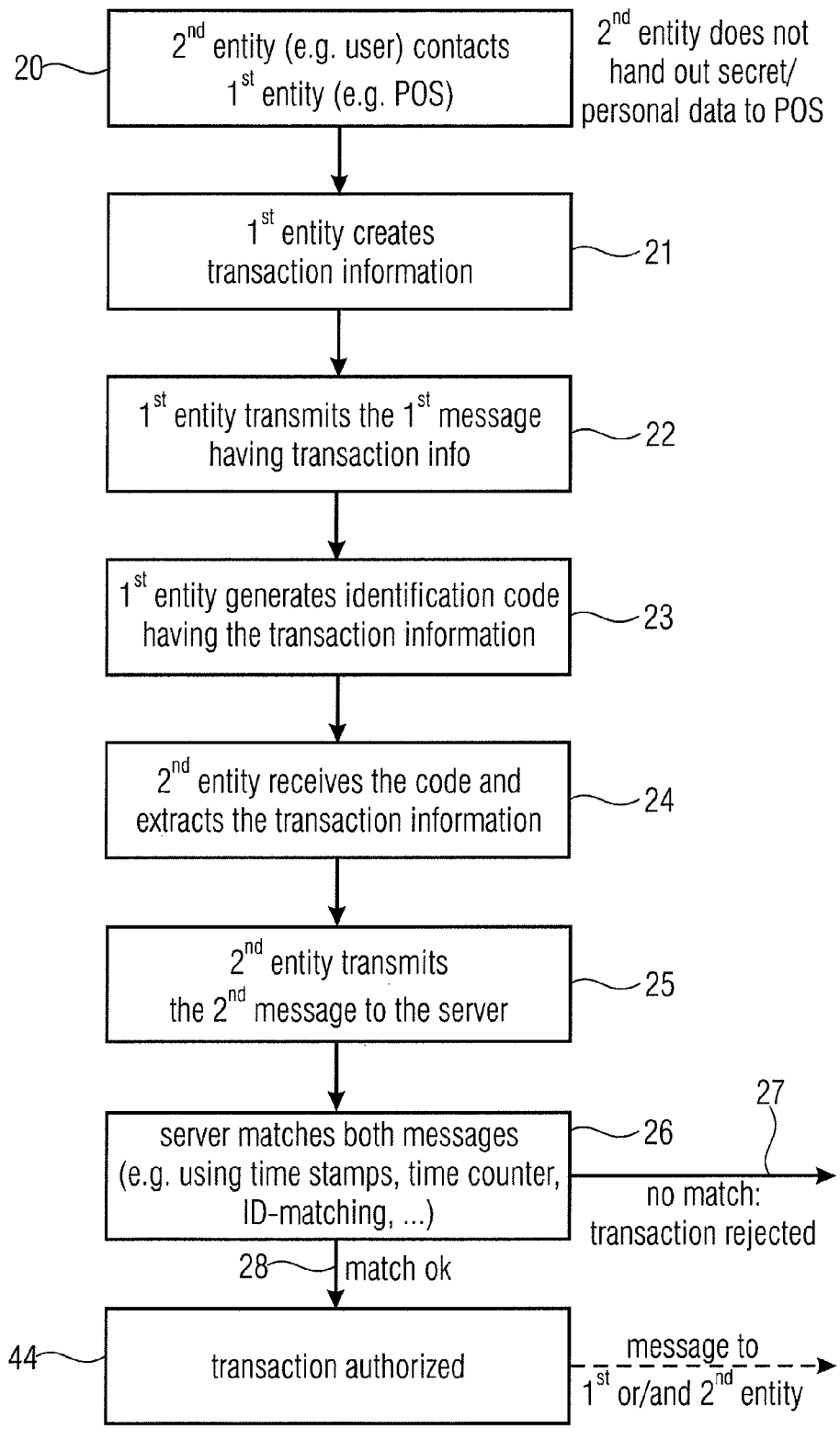
FIG. 1a is a sequence of steps performed by the first entity, the second entity or the server in one embodiment.
Figure 1B:
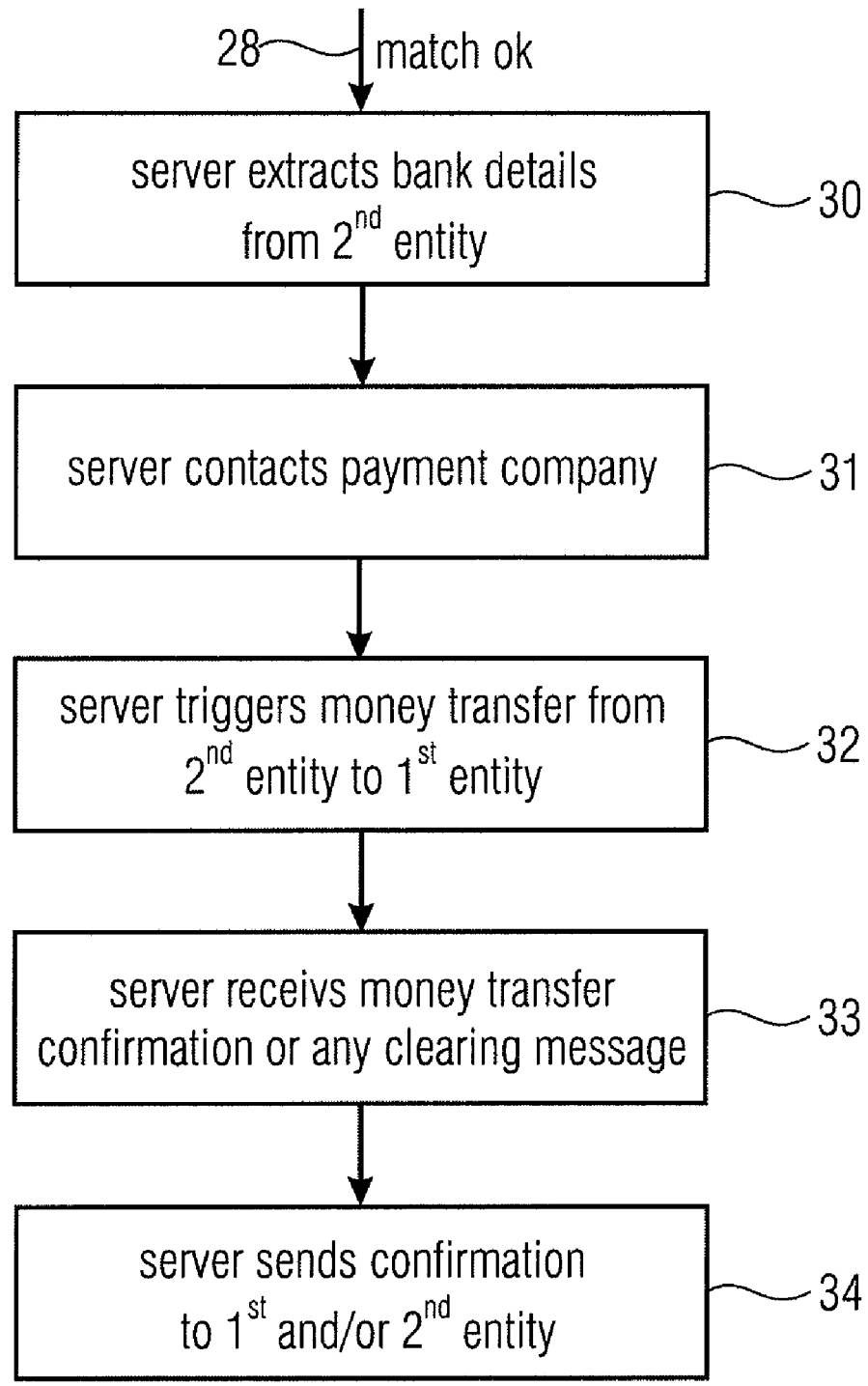
FIG. 1b is an additional sequence of steps performed between the server and a payment company in case of a positive matching of both messages.

Correspondences between the steps in FIG. 1a and FIG. 1b and FIG. 7a have been indicated. A specific implementation of step 22 is the first message where the selling party requests the buying party to pay. A specific implementation of step 24 is that a data transfer of an auto ID code takes place without any link between both parties such as via a one-way communication and, advantageously via an optical capture with the camera from the second entity 12. One implementation of step 25 is a message from the buying party to the server device that the buying party sends a payment request to pay the selling party. One implementation of an action in reply to the transaction authorized step 29 or the confirmation sending action 34 in FIG. 1b is that an information of the payment company to the selling party takes place that the payment is accepted or, in the other case, rejected. When the payment is accepted, the selling party will hand out the product and when the payment is rejected, the selling party will not handout the product.

Figure 7B:
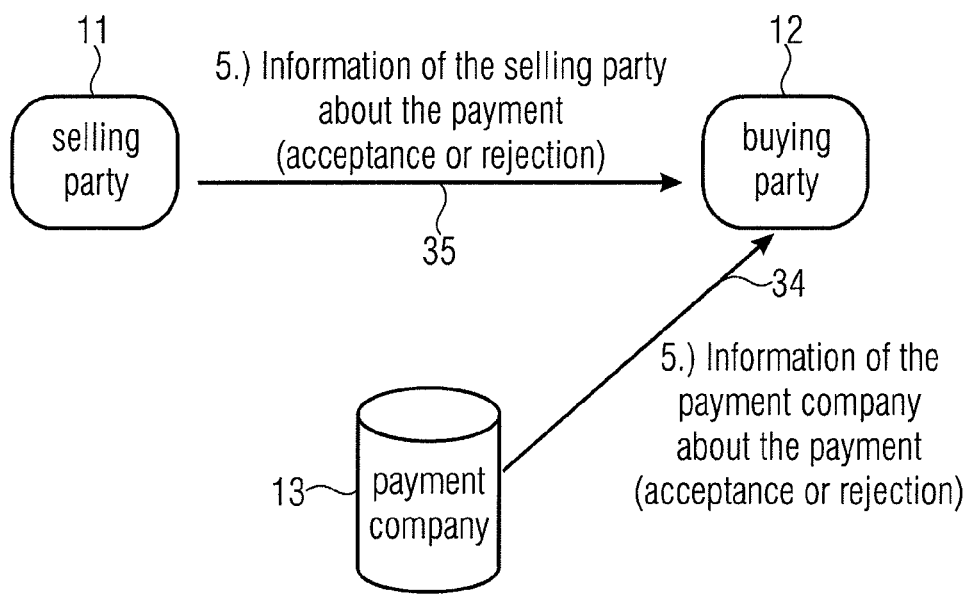
FIG. 7b illustrates an implementation of the process of FIG. 7a subsequent to the transaction authorization by the payment company.

FIG. 7b illustrates additional messages which can be performed in an embodiment. Specifically, the selling party may send an information of the selling party about the payment directly to the buying party as indicated at 35, where this transmission can be a direct transmission or a display or any other one-way communication which can, in general, have the same appearance as the data transfer of an auto ID code as indicated in step 24 of FIG. 7a. Furthermore, the payment company 13 can also send an information of the payment company about the payment such as non-acceptance or rejection as indicated at 34 in FIG. 7b and FIG. 1b. Therefore, the payment company can communicate the result of the procedure either to the selling party or to the buying party or to both parties.

Figure 2:
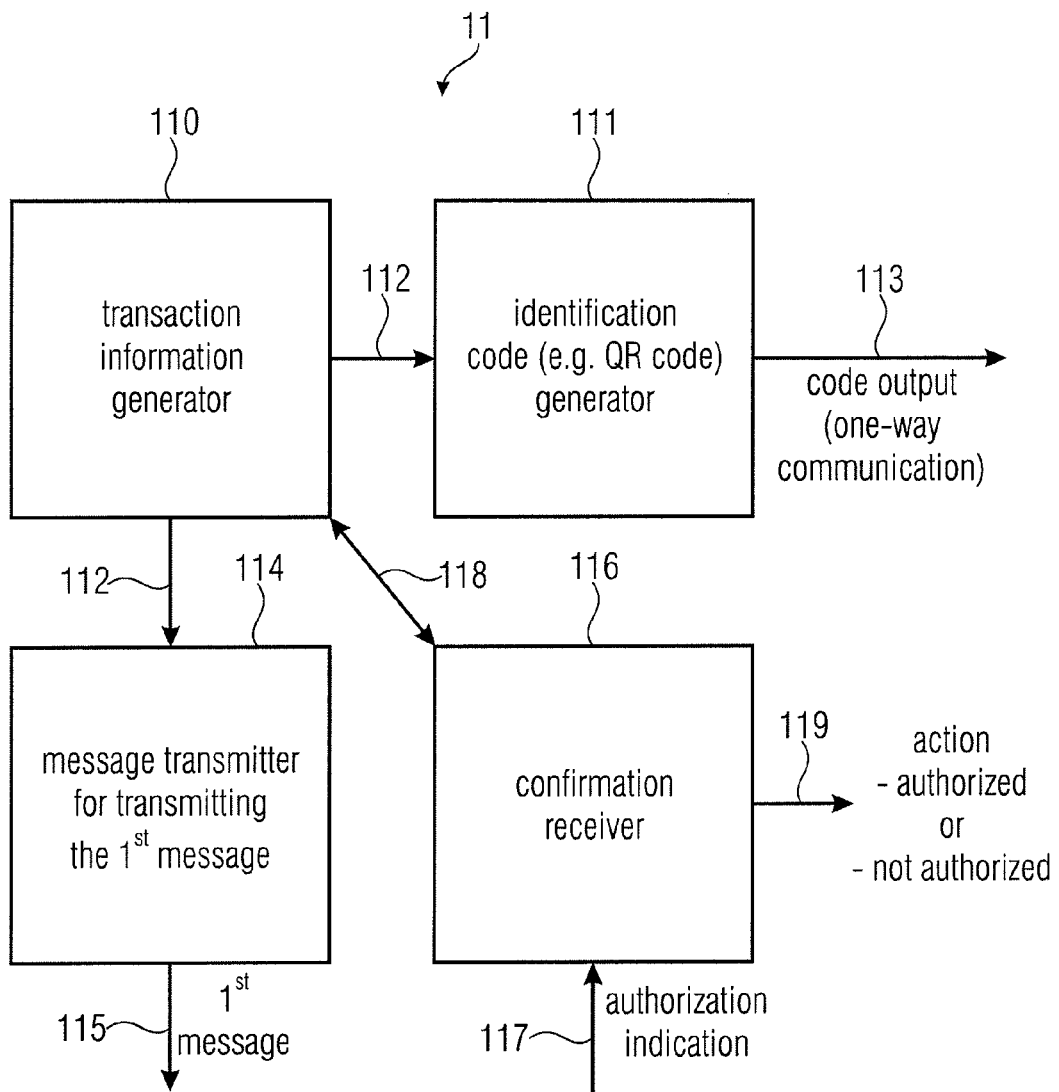
FIG. 2 is a block diagram of an embodiment of the first entity such as an POS.
Figure 10:
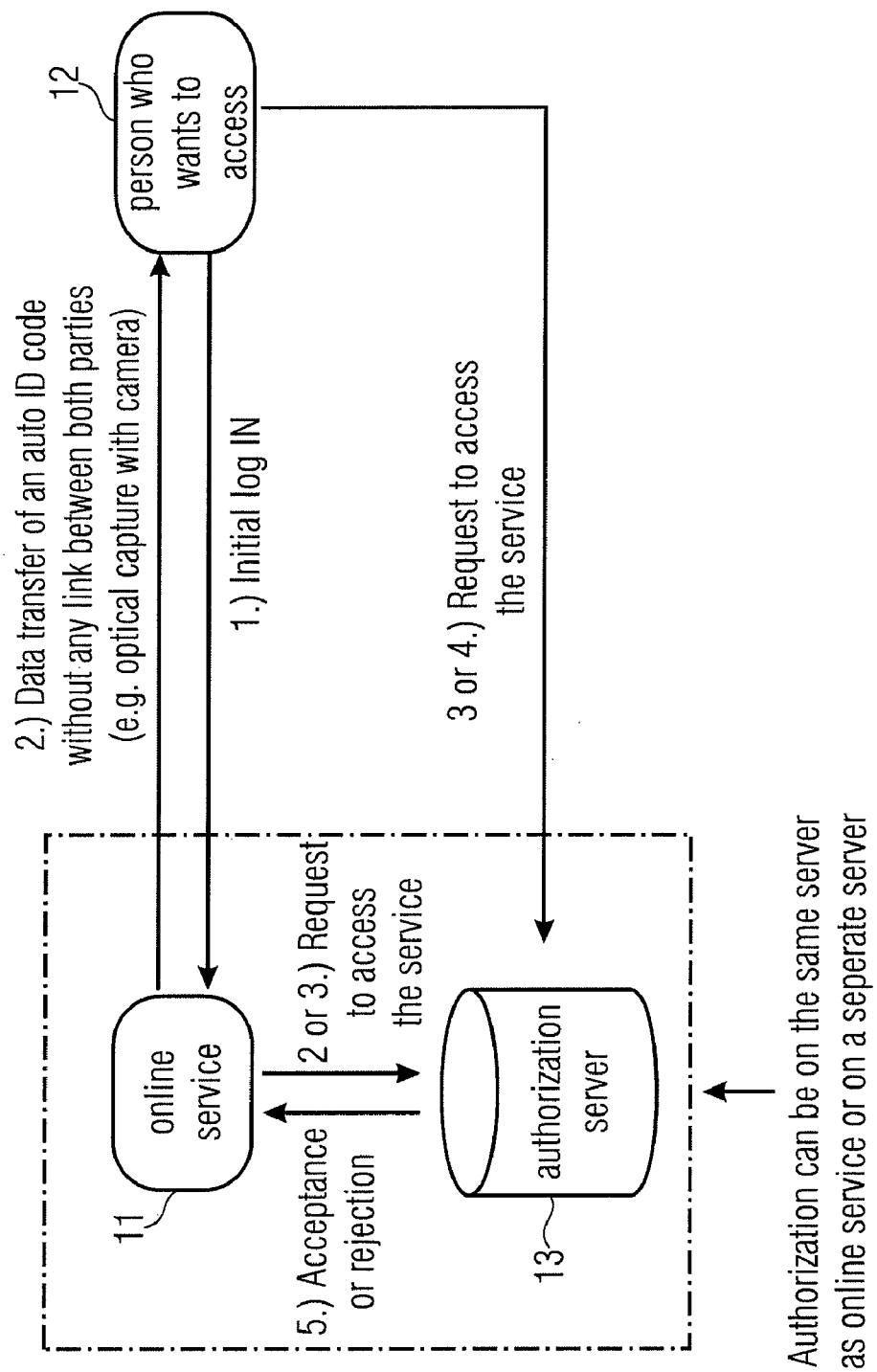
FIG. 10 illustrates an implementation for providing an authorization to access an online service.
Figure 11:
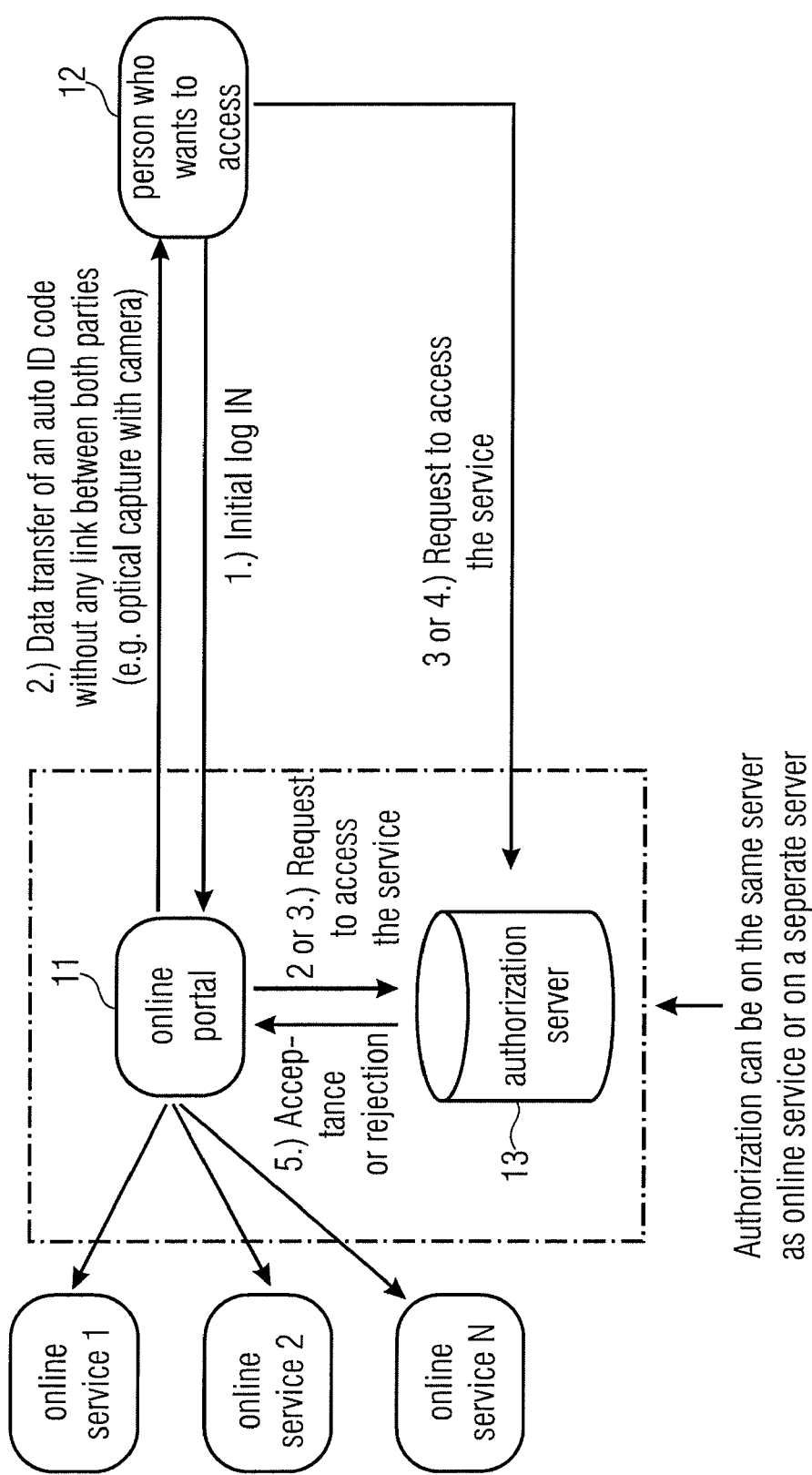
FIG. 11 illustrates an embodiment in which an access to one of several online services via an online portal is authorized.
Figure 12:
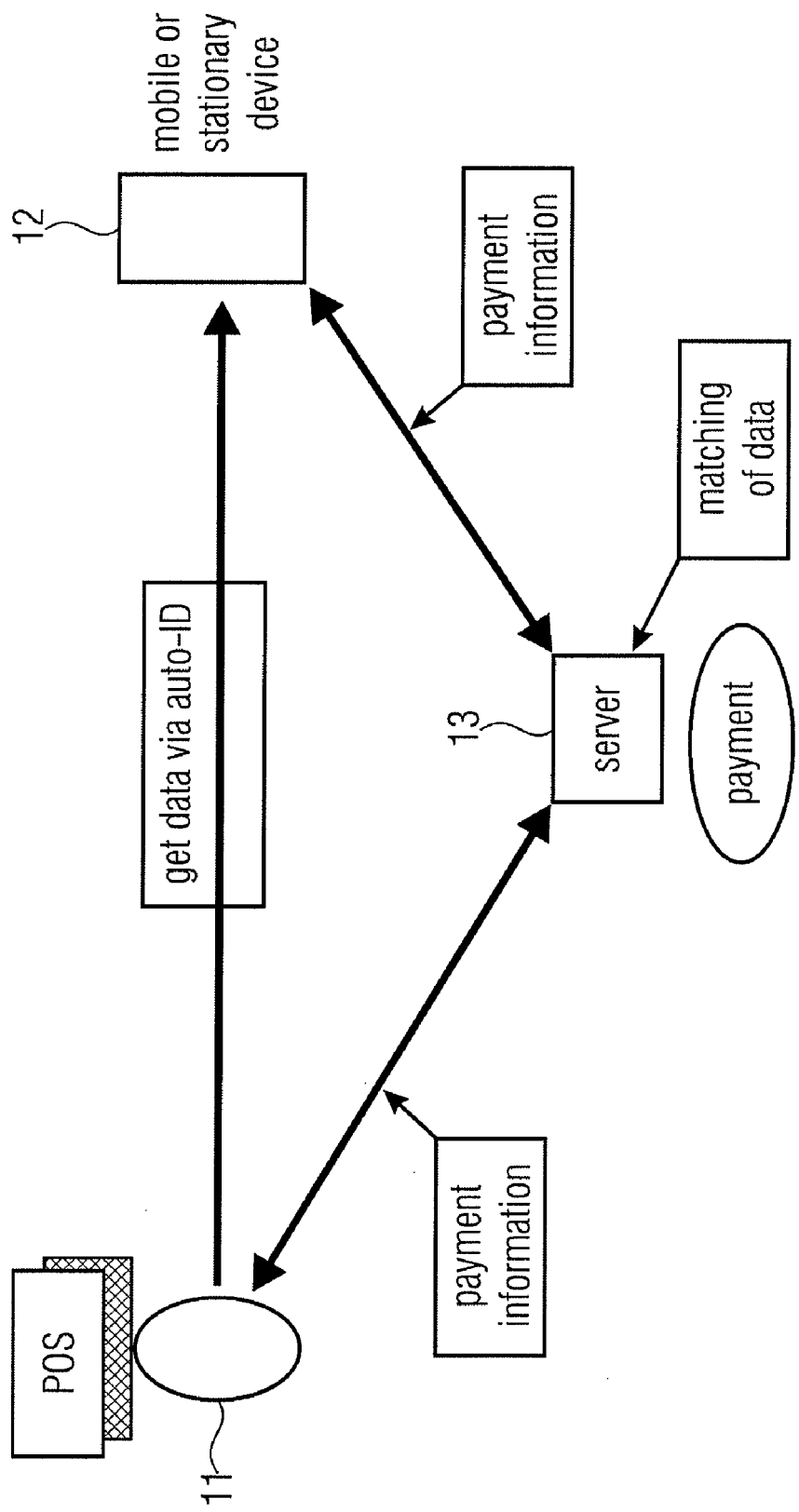
FIG. 12 illustrates a general overview over the inventive scenario.

FIG. 2 illustrates a block diagram of a first entity 11 which can, for example, be a POS or an online portal 11 as indicated in FIG. 11 or can be an online server as indicated in FIG. 10. The first entity 11 for performing a transaction with a second entity 12 under control of a server device 13 may comprise a transaction information generator 110 for generating information on the transaction. Furthermore, an identification code generator 111 is provided, which receives the generated transaction information 112 and generates a code 113 which is output via advantageously one-way communication. The code 113 may be a QR code or any other auto identification code or method, where any appearance of the code such as visual, via an audio transmission or via an RF transmission can be implemented. The first entity furthermore comprises a message transmitter 114 for transmitting a first message 115 to the server, where the first message 115 comprises the information 112 on the transaction. Furthermore, the first entity 11 comprises a confirmation receiver 116 for receiving, from the server, an authorization indication 117. Based on the received authorization indication 117, the confirmation receiver will double check, whether the authorization indication belongs to a certain transaction information as indicated by a connecting channel 118, and the confirmation receiver will than finally authorize an action or not. An authorized action may, for example, be the handing out of a product or the allowing of an access to a service or a different operation. The action authorized by the confirmation receiver does not necessarily have to be the transaction where the transaction information was generated by the transaction information generator. When the transaction is a payment transfer, then the conformation receiver will not authorize this transaction since this transaction is to be authorized by the server. When, however, the transaction is an access to an online service or online portal as discussed in connection with FIG. 10 or FIG. 11, then the action authorized by the confirmation receiver 116 will in fact be the transaction identified in the transaction information 112.

Figure 3A:
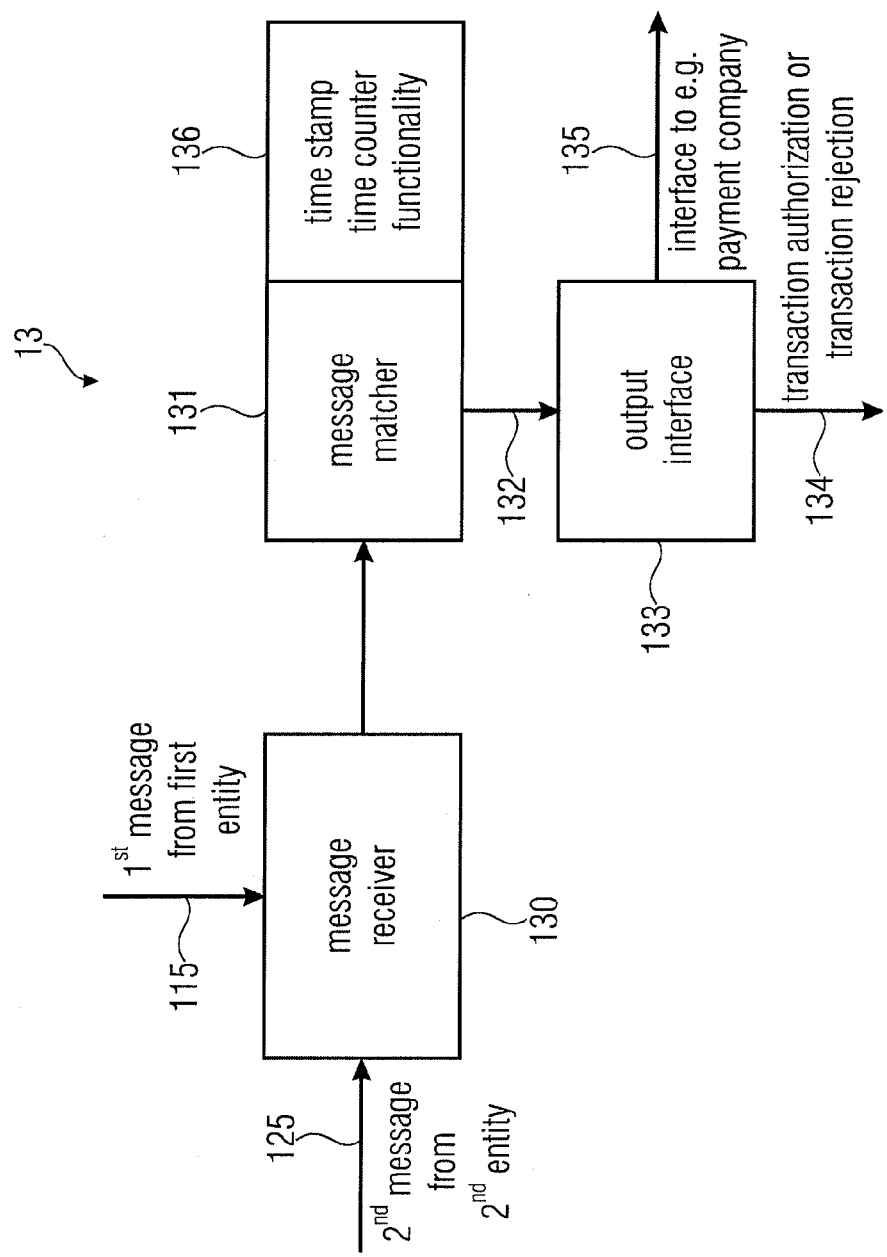
FIG. 3a is a block diagram of an implementation of the server.

FIG. 3a illustrates an implementation of a server device 13 for controlling a transaction between a first entity 11 and a second entity 12. The server device may comprise a message receiver 130 for receiving the first message 115 from the first entity 11 where the first message 150 comprises information related to a transaction, i.e., maybe the transaction information 112 generated by the transaction information generator of FIG. 2.

The receiver 130 furthermore receives the second message 125 from the second entity 12, where the second message furthermore comprises transaction information which is related to the transaction. Furthermore, the server 13 comprises a matcher 131 for checking whether the first information in the first message 115 and the second information in the second message 125 have a predetermined relation to each other. The result of 132 of this checking operation performed in the message matcher 131 is forwarded to an output interface 133 for authorizing the transaction, when the first information and the second information have a predetermined relation to each other and for rejecting the transaction when the first information and the second information do not have a predetermined relation to each other. The authorization or rejection can be performed via the transmission of messages over an authorization/rejection channel 134. Alternatively or additionally, an interface 135 to, for example, a payment company or any other further entity can be activated in order to perform further steps for completing a transaction. Typically, interface 135 will only be activated in case of a positive result 132, generated by the message matcher 131.

The message matcher 131 may have a time stamp, a time counter or any other time-related functionality 136, in order to perform a certain way of message matching. Both messages, i.e., the first message 115 and the second message 125 may comprise a transaction identification. Furthermore, both messages may comprise an identification of the first entity, but do not necessarily have to comprise an identification of the second entity. Based on the transaction identification and/or the identification of the first entity or based on a certain identification of a product or a service which is e.g. a product ID or a product price, the message matcher will search for received messages having such related information.

Furthermore, it is of advantage that an additional time feature is implemented which makes sure that only messages are accepted as matching messages when these messages were received by the server within a certain time period. In this case, the receiver would add a time stamp to a received message indicating the actually received time and the message matcher would be operative to only determine a match, when the time difference between the reception time instance of the two messages is less than a certain time period, such as one hour or maybe 30 minutes or advantageously 5 minutes.

Alternatively, the message transmitter in the first entity and the message transmitter in the second entity will add a time stamp indicating the actual transmission time and the message matcher will evaluate a time difference between these time stamps which, for a positive match, should be lower than a predetermined time period, such as 60 minutes and maybe 30 minutes or advantageously, 5 minutes.

Alternatively, the identification code may actually comprise a time stamp which is extracted by the second entity and which is transmitted by the second entity to the server where a reception time of this message can be compared to the generation time of the output code, in order to only come to a positive match when the time difference between those time instances is less than the predetermined amount. Therefore, in general, the time functionality 136 of the message matcher will be operative to evaluate the time difference between two events related to the generation of the identification code and/or the transmission of the first message with respect to a transmission and/or reception of the second message.

Figure 3B:
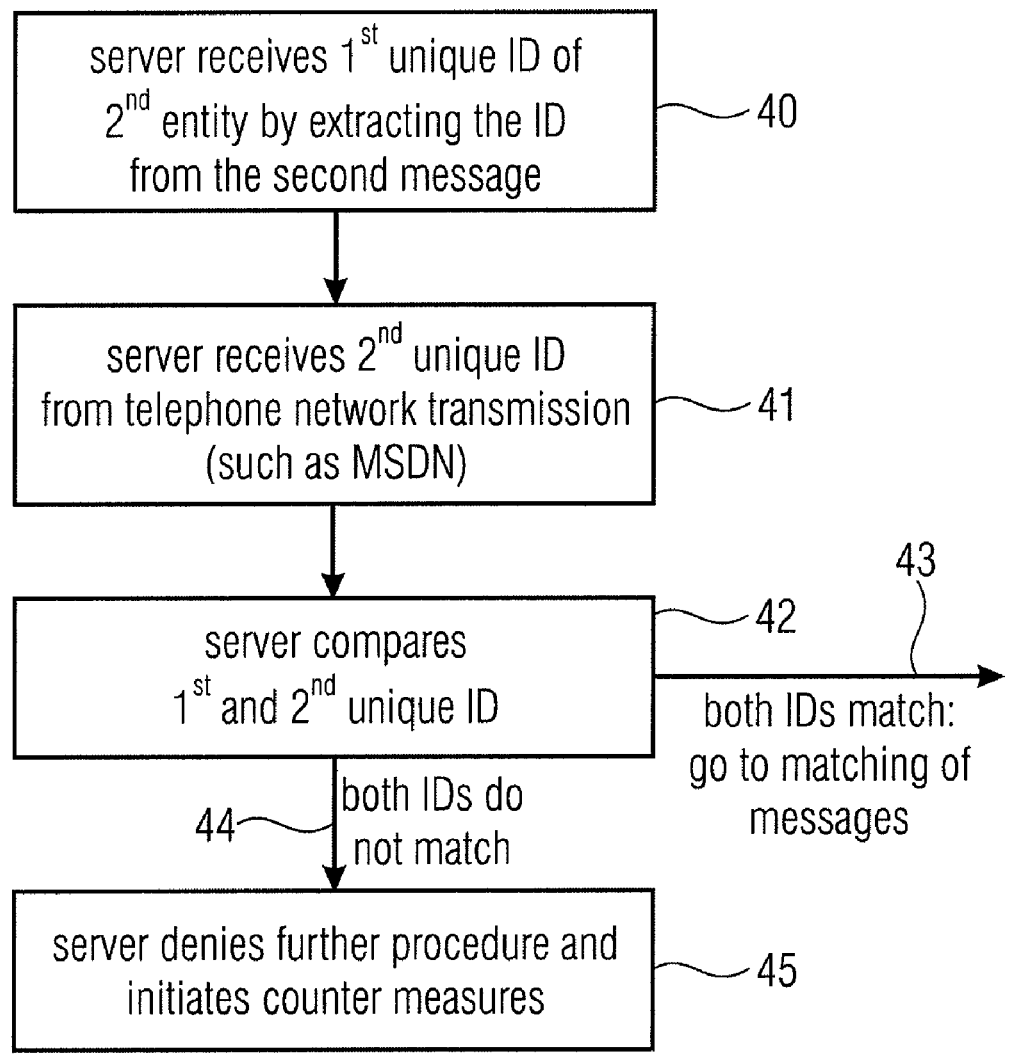
FIG. 3b is a sequence of steps performed by the server for performing an additional optional security check based on information such as the mobile service device number (MSISDN/IMSI) and/or IMSI.
Figure 4A:
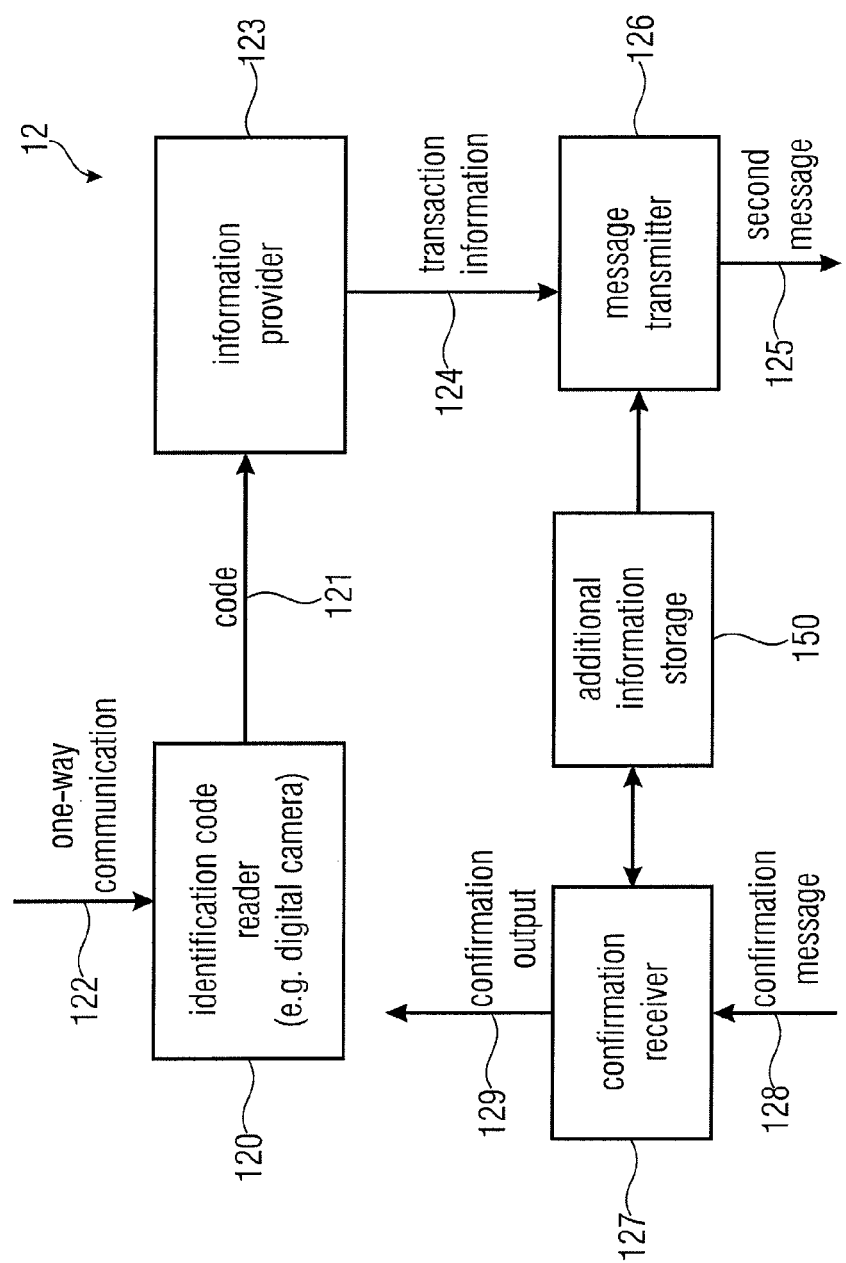
FIG. 4a is a block diagram of an implementation of the second entity such as a mobile phone with a digital camera.

The application running in a mobile device implementing the second entity as discussed with respect to FIG. 4a may be implemented to add to the second message the mobile service device number like IMEI or MSISDN or IMSI for which the application has been registered. The mobile service device number is a combination of the personal identification number including the SIM card and a serial number of the mobile phone. Therefore, when a SIM card is input into a different mobile phone compared to the mobile phone for which the IMEI or MSISDN or IMSI was registered, an IMEI or MSISDN or IMSI transmitted via a second message will be different from an IMEI or MSISDN or IMSI which is transmitted together with the second message due to the transmission protocol of the communication network. Typically, each communication, be it an actual telephone call or an SMS communication includes this IMEI or MSISDN or IMSI actually taken from the SIM card and the mobile phone serial number. Therefore, as indicated in FIG. 3b, the server will receive, in step 40, a first unit number of the second entity by extracting the ID from the second message. This can be an IMEI or MSISDN or IMSI as fixedly programmed into the application running on the mobile device, for which the whole payment software was registered.

Furthermore, the server receives a second unique ID from the telephone network transmission, which can also be an IMEI or MSISDN or IMSI, as indicated in step 41. However, the IMEI or MSISDN or IMSI, indicated in step 41 will be different from the IMEI or MSISDN or IMSI extracted in step 40, when the user has put a SIM card into a different mobile phone compared to the mobile phone for which the whole payment service was initially registered. In step 42, the server will compare the first and the second unique ID and will proceed to a matching of messages performed in item 141 in FIG. 3a, when both IDs match as indicated in 43. When, however, both IDs do not match, as indicated at 44, then the server will deny a further procedure and may or may not initiate counter measures as indicated in 45. Therefore, this check will be a pre-check performed by the message matcher 131, before the actual matching of two different messages will be performed. This initial check provides a convenient and easy examination of the second message without any additional operations in order to early reject non-allowed messages and even hostile attacks.

FIG. 4a illustrates the implementation of the second entity 12 for performing a transaction with a first entity 11 under control of a server device 13. The second entity may comprise an identification code reader 120 for reading an identification code generated and output by the first entity, where the identification code has encoded information on the transaction. In one embodiment, the identification code reader comprises a digital camera in order to take a photograph of the code 121. Furthermore, an advantageous way of reading the identification code will be a one-way communication 122, for which a second entity will not have to transmit any information to the first entity and where the second entity has the full control over what is transmitted from which entity to which entity. The code 121 is input into an information provider 123 for providing the information on the transaction included in the identification code. In one embodiment, the information provider will be an identification code interpreter, such as an identification code decoder. Alternatively, the identification code can be decoded by any other means and the code or the code information or at least the transaction information can be even be manually input into the system so that the information provider would be an input device such as a keyboard, a mouse, a trackball or any other device. The information provider 123 will output the transaction information 124 and forward the transaction information to a message transmitter 126. The message transmitter 126 will transmit the second message 125 to the server wherein the second message comprises the transaction information 124.

Additionally, the second entity comprises a confirmation receiver 127 for receiving, from the server, an information message 128, indicating that the second message 125 has a predetermined relation to the first message 115, received from the first entity 11. The confirmation receiver will output a confirmation output 129. The second entity may comprise an additional information storage 150, having additional data, such as a unique ID/IMEI or MSISDN or IMSI as discussed in connection with FIG. 3b or having information on payment details, etc., which can be forwarded to the message transmitter 126, so that the second message 125 not only includes the transaction information 124, but such additional information provided from the additional information storage 150.

Figure 4B:
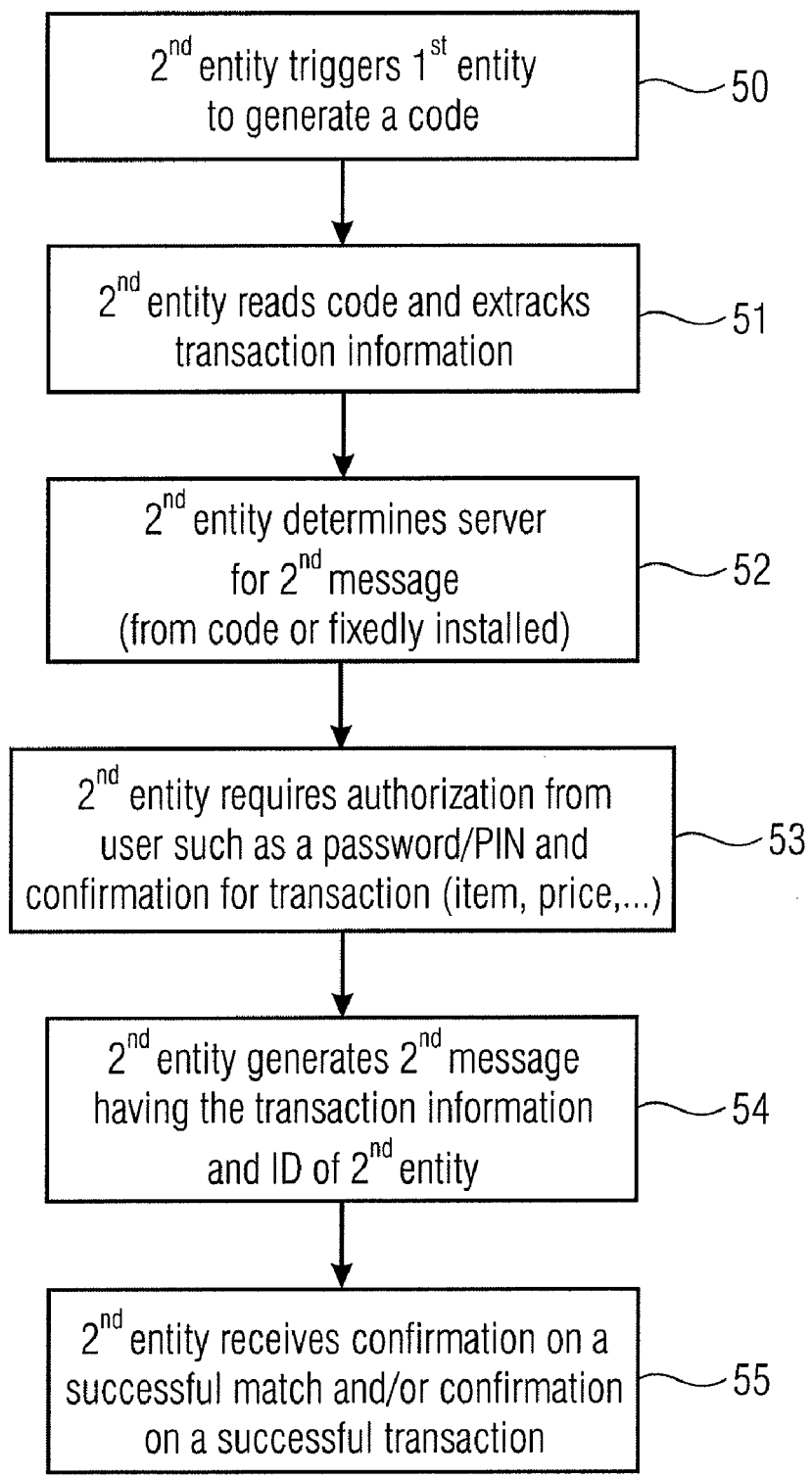
FIG. 4b is a sequence of steps performed by the second entity including requesting of a secret from the user.

FIG. 4b illustrates processes performed by the second entity 12. In step 50, the second entity approaches a first entity and triggers the first entity to generate an identification code. In step 51, the second entity reads the code and extracts the transaction information from the code. In step 52, the second entity determines the server to which the second message is to be sent. The information on the server can be included in the identification code read in step 51, and is extracted from the code in this embodiment. In a different embodiment, the address for the server to which the second message is to be sent can be fixedly installed and, for example, included in the additional information storage 150 of FIG. 4a. In step 53, the second entity, such as the mobile phone or any other mobile or stationary device will need an authorization from the user, such as a password or a PIN and maybe, confirmation for a certain transaction. Then, in reply to step 53, the actual human user will input the password or PIN, so that the second entity will continue with the process. In step 54, the second entity will generate the second message having the transaction information and, advantageously, an identification of the second entity. Step 53 does not necessarily have to be performed immediately before step 54, but can be performed at any place before generating or actually transmitting the second message to the server. This makes sure that the second message is only transmitted from a second entity which has been fully authorized by the human user. In step 55, the second entity will receive a confirmation on a successful match and/or confirmation on a successful transaction.

FIG. 5 illustrates six different applications and the corresponding transactions and a collection of transaction information which can be included in the identification code generated by the first entity and which may also be included in the first message or the second message.

The individual processes illustrated in FIG. 5 are discussed in detail later on.

FIG. 6a illustrates an implementation of the transaction information. The transaction information can include the transaction ID portion 61, and the transaction record portion 62. The transaction ID portion 61 may include a string of characters and/or numbers and the transaction record 62 will comprise different data items. The transaction record can be included in the auto-ID code or can be separately sent to the second entity from the first entity or can be separately sent to the server from the first entity together with the transaction ID.

FIG. 6b illustrates an implementation of the second message 125 as sent from the second entity to the server. The second message includes a transaction information part 125a and maybe an additional user data part 125*b*. Advantageously, the second message does not include any user secrets. Thus, the user can be sure that any secrets are not distributed to the server or to any other party which will probably intercept the second message.

Furthermore, the inventive process is unique in that the user does not have to give any personal data to the first entity, even giving the name is not necessary. Furthermore, the user provides his secrets only to his own device and the secrets do not arrive at the first entity or the server or any other party who may not be an intended recipient of the second message. A further feature contributing to the safety of the inventive process is the one-way communication for capturing the ID code, and specifically, the matching of the messages. All these features create a high confidence by the user and do not suffer from inconvenience and, therefore, contribute to a widespread acceptance by the users.

Subsequently, the inventive process will be summarized and specific implementations as summarized in FIG. 5 will be discussed in detail.

Since the introduction of electronic payment and account authorization, criminals have been searching for ways to steal sensitive payment/account data for their criminal activities. The objective of the solution described in this patent is to strengthen the security of the payment transaction or authorization (for example protect access to a online services) by avoiding the necessity to hand over any sensitive payment details from the buying party (for example credit card number) to the selling party which can be used for criminal activities and at the same time simplifying the use of mobile paying. The same procedure can be used for any other kind of authorization like access to web services (e-mail), login to company networks etc.

As the procedure for authorizing a login to an online service is similar to the process of payment, the selling party can also be the web service provider. The buying party can be the person who wants to access the web service. The payment server is the server who processes the authorization. The payment details are similar to the login credentials. Each party involved benefits from this method of payment/authorization. Major benefits are:

The buying party does not have to disclose sensitive data incl. payment details to any third party.
The risk that his/her data will be misused is reduced to nearly zero.
The selling parties' risk of unintentionally disclosing the sensitive payment details of his/her customers is reduced significantly, since they don't receive those data.
The number of fraud claims to the payment companies can be reduced to a minimum.
The buyers don't need to enter data into their mobile phone since this is done by the application through reading the Auto ID Code.
In case of authorization processes the major benefit is that even the data is stolen nobody is able to misuses the stolen data.

In current payment/authorization scenarios, it's often necessary to hand over sensitive payment data by the buying party to the selling party. This data can in some cases be easily copied and stolen. These risks also apply for authorization processes. Some actual examples:

Theft during the data transmission
Theft of the data on the server of the selling party (e.g. hacking, on site theft, etc)—Fraudulent manipulation of the reading devices to capture the sensitive payment data (e.g. manipulated card readers, manipulated keyboards, skimming, etc)
Criminal acts by people during CNP (Card Not Present) payment processes
Copying of credit card data in restaurants etc.
Theft of login credentials The core of this new solution is a concept or method where the buying party does not have to hand over sensitive payment data (like credit card numbers) to the selling party in order to perform the payment transaction. This concept might be used as well for any other action where authentication/authorization is needed. The Transaction ID send by the buying and selling party is matched by the (Payment/Authorization) Server.

In this new concept/method of payment/authorization, existing technologies are used but in such a way that weaknesses of the current payment/authorization processes are substantially reduced.

This is achieved by capturing/reading an Auto ID code (e.g. QR Code), given by the selling party, with a device (e.g. mobile phone, etc). By capturing/reading the Auto ID code the data inside the Auto ID code is received by the buying party (e.g. optical capturing/reading with a camera, etc). This data (or parts of the data) is sent (e.g. via a mobile phone network, etc) to the secure payment server which is connected with the buyers' payment company. Alternatively the Auto-ID code can be read by the user (buying party) and put in manually into the (mobile) device.

1. Transaction ID Generated by the POS:

The advantage of a POS generated Transaction ID is speed. The communication between the buyer and the seller is already active. In this case it only takes a moment for the seller to generate a Transaction ID based on Invoice#, Amount, Date, item number etc. Instead of waiting for server feedback the transaction is initiated instantly. At this time both the seller and the buyer agreed on proceeding so the following process is not time critical. The patent application describes a process that includes an unpredictable time for waiting. This can cause a cancellation of the transaction because of inconvenience. In our process the deal is done after verification of both parties and acceptance of payment. The confirmation/rejection of the payment is sent after a secure check of both parties.

2. Two Way Transaction Application to the Server:

Our process of sending and matching the transaction details from both parties is the only way to avoid faked transaction trials and "man in the middle attacks". This way the first 'one-way' communication between the seller POS and the buyer terminal is validated or re-checked by the buyer communication on the server. Therefore it's nearly impossible to fake a payment by generating transactions and sending them to the server. Also this two way transaction increases the security level against man-in-the middle attacks because the Transaction ID is sent via two ways and optional both ways might be secured via security technologies like VPN, Certificates or other. Also attacking against the POS (for example a Web shop) makes no sense for the attacker anymore because the confidential personal data from the selling party is not stored in the POS System. As there is no request of a transaction ID from the selling party to the server also it is not possible to fake the payment server by hacker and to send a fake transaction ID(s).

The invention increases the speed of a transaction, increases the security to a level which is not available today (which is proven by several attacks and confidential data stolen at this times) and also it is increasing the convenience for all engaged parties.

One embodiment is illustrated in FIG. 7a.

A request from the selling party and the buying party is sent and by matching both requests, the transaction or authorization will be proceed and the security can be increased further.

By adding confirmation(s) in whatever form to the buying party (from the selling party and/or payment company), the information flow and convenience can be increased (FIG. 7b).

Figure 8:
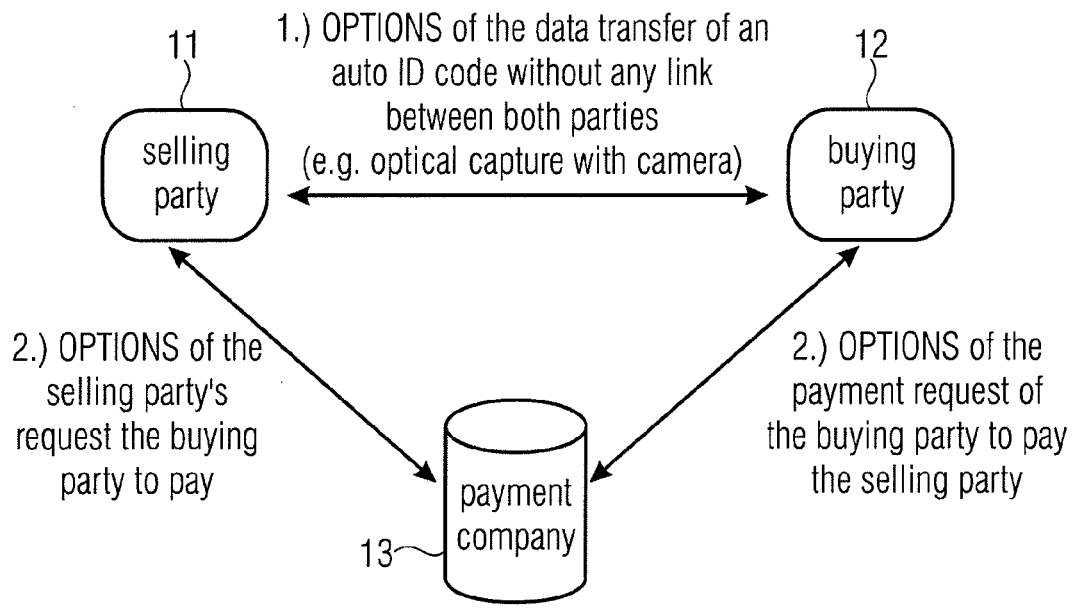

To make the application/process more secure and/or more convenient for all parties (direct and indirect) involved several options are possibly shown in FIG. 8

Figure 9:
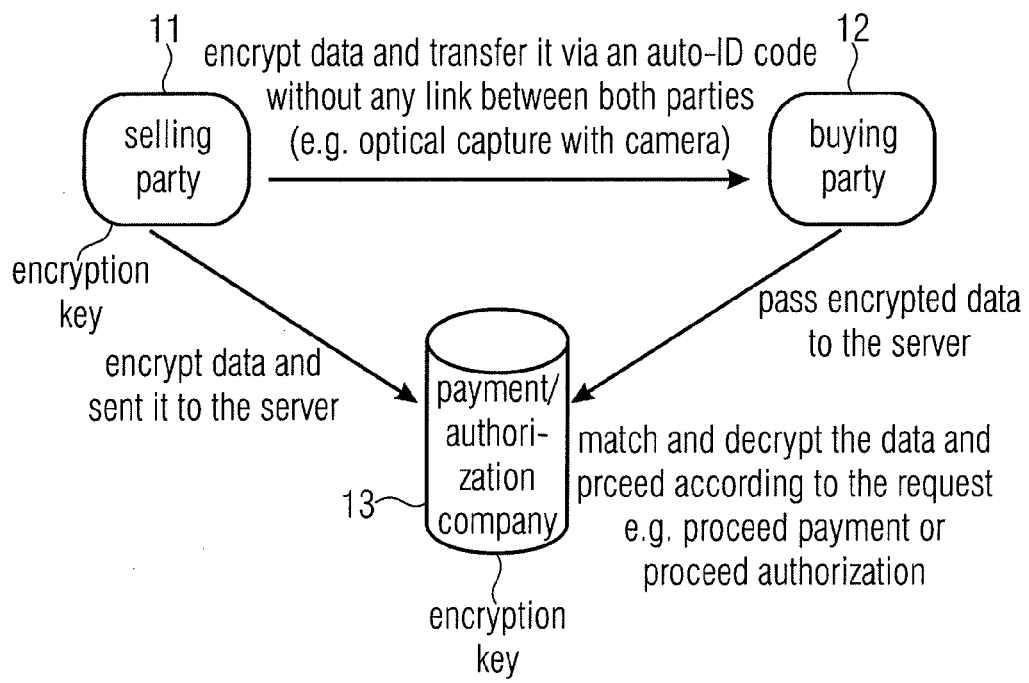
FIG. 9 illustrates an implementation where encryption techniques are used.

To increase the security it is also possible to use Security Technologies like, but not limited to, PGP. Here during the installation of the service at the selling party side public and private keys are generated and exchanged with the authorization server (in the payment scenario the payment server). This has to be done just once and then the encryption can be used. If a payment/authorization is requested the selling party creates a transaction ID. Encrypt it with its key(s) and transfer it to the (mobile) device via any Auto-ID Technology or method. The (mobile) device passes the data to the server where the data is decrypted and matched (or matched and decrypted). Then the requested action (for example proceeding and authorization/denial of a payment will be processed. This has the advantage that in the unlikely event of a man in the middle attack the data is useless for the attacker and the payment is still secure. Also if the attacker is able to get the data during the transfer of the Auto-ID code it is useless for him because it is encrypted. It is also possible to establish a secure session between the (mobile) device and the Server with any security technology for example https and or PGP. Also a combination of security methods is possible for example the first entity encrypt the message with its PGP key and the second entity encrypts the encrypted message again with it's own PGP key. Only the third entity, who has both keys is able to encrypt the message. This is illustrated in FIG. 9.

In the case of Authorization the process is illustrated in FIG. 10 or FIG. 11. The Authorization Server can be placed somewhere internally or it could be an external server or service.

In case the user can access multiple web services, reference is made to FIG. 11.

Subsequently, advantageous factors for various ways of mobile device payment/authorization are described.

1. User Identification/Authentication (for Example User-name/Password) but it is not Limited to Identification Via Code (Optional), User Name (Optional), Password (Optional), MSDN (Optional) IMEI (Optional), MSISDN (Optional), IMSI (Optional), Authorization Code (Optional) or PIN (Optional), Biometrical Data (Optional) or any Other Identification Technology or a Combination.
   Store
   POS/web site
   Mobile (optional) device
   Client software
   Others
2. Initiation of the Communication
   Selling Party initiates the communication
   Mobile (optional) device/Client software initiates the communication
3. Data Encryption
   Encrypted code
   Encrypted data (content)
   POS/web shop encrypt the data
   Mobile (optional) device encrypt the data
   Encrypted communication
   Other
4. Media for Auto ID Code
   PC Display
   TV Display
   Mobile phone display
   The other displays (vending machine, ticketing, parking, etc.)
   Paper (or e-paper/e-books in the future)
   Other
5. Types of Auto ID Code
   Optical (like Barcode, 2D Code etc.)
   Radio (RFID, NFC etc.
   Touch
   Contactless
   Active Codes (movie function)
6. Types of Payment
   Credit card
   Debit card
   Bank card
   Virtual Card
   new money
   Other
7. Selection of Payment
   Selected at POS/web site before reading Auto ID code
   Manually selected
   Automatically selected
   Other
8. Additional Security
   Password
   Pin code
   Biometrics technologies (finger print, eye, voice etc.)
   Other
9. Target Server Selection
   Selected at POS/web site before reading Auto ID code
   Selected at Mobile (optional) device after reading Auto ID code
   Primary server is defined at client software/mobile (optional) device, and the primary server forward the data to another server
   A Proxy Server who is forwarding the server the "Master" Server
10. User Information
    Registered mobile (optional) device related User ID
    Registered client software related User ID
    Payment method related User ID
    User Related User ID
    SIM card based User ID (if not build into the phone)
11. Action Confirmation
    Before reading Auto ID code
    Before communicate with the server after read the code
    After completed the communication for the payment
Application 1. Auto ID Online Payment:
    In this application either the mobile (optional) device and the selling party send information to the payment company (or a company instructed by the payment company)
Process (this Process can be Aborted Anytime by the User and the Sequence is Variable):
    The user selects the payment method
    The user selects Auto ID
    A certified (optional), formatted (optional), unique (optional) Auto ID code is generated and displayed on the displaying media like a screen, a display, a TV, a time table, or a piece of paper
    Data in the Auto ID code is but not limited to:
        ID of online Shop, selling party or supplier (optional)
        Transaction ID (optional) with or without time limitation (time limitation in this terms means that the Transaction ID is only valid for a certain time window)

Time Stamp (optional)
Price and/or amount (optional)
Customer ID (like name, customer number, account number, etc) (optional)
Address of server specified by the payment company and/or a company instructed by the payment company (optional)
ID of payment company (optional) (in case of 1 server/1 address for more than 1 payment company)
Other data (optional)
Check digits The application to capture/read the data will be started automatically or manually by the user. The access to the application is protected via Username and/or Password and/or PIN or any other authentication method (optional)

Auto ID code is captured/read by the mobile (optional) device or server (for example in the case an image is taken or the device is not able to read the Auto-ID code directly)

Process confirmation by the user. For example: do you want to pay: list of products?Y/N (optional)

Price and/or amount is displayed on the display media (optional)

Question if amount is OK (optional)

Question if user wants to proceed (optional)

Input of an unique Identification Code (Optional), User Name (optional), Password (Optional), MSDN (optional), IMSI (optional), IMEI (optional) MSISDN (optional) Authorization Code (Optional) or PIN (optional), Biometrical Data (optional) or any other Identification Technology or a combination.

Mobile (optional) device initiates a link with address of server specified by the payment company or a company instructed by the payment company The following data is transmitted by the mobile (optional) device to the server specified by the payment company or a company instructed by the payment company:

ID of the selling party for example an Online Shop/Store (optional)
Transaction ID (optional) with or without time limitation (time limitation in this terms means that the Transaction ID is only valid for a certain time window)
Time Stamp (optional)
Price and or amount (optional)
Customer ID (like name, customer number, account number, etc) (optional)
ID of payment company (optional) (in case of 1 server/1 address for more than 1 payment company) (optional)
Other data (optional)
Check digits The Data is matched by the server. If it is matching the server will proceed with the payment process (acceptance or rejection)

If the payment is approved, the store or the selling party or the supplier (or a combination) get(s) a confirmation that the payment is OK (optional).

The buyer gets information (via email, SMS, MMS, via the online application on his/her mobile (optional) device or via any other means) that his/her buy transaction has been completed (optional)

Additional Options:

Option: The information given to the mobile (optional) device is encrypted via any encryption technology like PGP Option: The data in the Auto ID code is encrypted (like PGP). The encrypted data is decrypted by the server or by the mobile (optional) device and some parts of this data (all optional) are displayed by the mobile (optional) device.

Option: The data sent from the mobile (optional) device to the server is encrypted Option: The server address in mobile (optional) device is fixed without the opportunity to change for the user (optional)

Option: The server address, single or multiple in mobile (optional) device is fixed but the user has the choice to select the service (server) he likes to use Option: The user has the option to select different services like way of payment (credit/debit or other), bank account (optional)

Option: The connection is secured via certificates

Option: The mobile (optional) device reads/captures the data and forwards it to the server without displaying it to the user Option: The mobile (optional) device read/capture the data and forward it to the server and partly displays relevant data to the user Option: The mobile (optional) device read/capture the data without any execution of the captured/read data, the mobile (device) just forwards the captured/read data to the server Option: The mobile (optional) device read/capture the data with a partly execution of the captured/read data, and forward the data needed to the server Option: The data from the mobile (optional) device to the server will not be sent via the public internet. It will be sent via a closed user group, terminated within the mobile operators' network or any other way not using the public internet.

Option: The mobile (optional) device connects to the server either via an online or an offline connection. An offline connection for example is a connection via SMS, MMS, E-Mail or any other voice or data service.

Option: A Proxy Server is used for example at Operator side. The Proxy server passes the data to the main server. Optional the proxy server might add additional information like IMEI or MSISDN or IMSI, or other.

Option: The connection and/or the user authentication is secured via certificates and/or existing technologies like PEAP or other Option: The identification of the user to the server can be done via a unique ID, a username, password, MSDN, IMEI, MSISDN, IMSI or a combination of each.

Option: The Payee has to be authorized at the payment server

Option: The connection between the buying party and the authorization server (for example payment server) is secured via encryption like VPN and/or any possible authentication technology Option: The Server send payment related data to the selling party Option: The Server sends payment related data to the buying party Option: The Server sends Account related data to the selling party Option: The Server sends Account related data to the buying party Option: The Server sends any other data to the buying and/or the selling party Option: The Server validates the selling party Option: The Server validates the buying party Option: The Server validates the transaction fully or partly Option: The selling party generates the Auto-ID Code Option: The server or any other institution generates the Auto-ID code and send it to the selling party Definitions Auto-ID code: An Auto-ID code is any kind of data formatted, machine readable and described in the specific Auto-ID specification like it is for example for the QR-Code in the ISO/IEC 18004 Standard Auto-ID: Auto-ID is the technology to exchange data in an easy and convenient way via wireless, scanning, image capturing, NFC or any other technology in this area Payment Company: Companies like Visa, Master Card, EC Card, PayPal, banks or any other company dealing with money, money transfers or financial transactions (like stock trading)

Capturing/Reading: Data Capturing/Reading in this terms is for example that an QR Code displayed by the selling party is photographed via the camera of a mobile phone and translated into data via a QR Code reading software Application 2 Auto ID Cash Redraw (Like Atm, Cash Terminals from Banks, Etc)

In this application the cash terminal and the mobile (optional) device send information to the payment company (or a company instructed by the payment company)

Process (this Process can be Aborted Anytime by the User and the Sequence is Variable):
- The user identifies himself with an ID (can be NFC ID, EC card, credit or debit card, etc) (optional)
- user selects cash payout and/or amount
- A certified (optional), formatted (optional), unique (optional) Auto ID code is generated and displayed on the displaying media like a screen, a display, a TV, a time table, or a piece of paper
- Data in the Auto ID code may include but is not limited to:
  - ID of cash terminal (optional)
  - Transaction ID (optional) with or without time limitation (time limitation in this terms means that the Transaction ID is only valid for a certain time window)
  - Time Stamp (optional)
  - Amount (optional)
  - Customer ID (like name, customer number, account number, etc) (optional)
  - Address of server specified by the payment company and/or a company instructed by the payment company (optional)
  - ID of payment company (optional) (in case of 1 server/1 address for more than 1 payment company)
  - Other data (optional)
  - Check Digits
- The application to capture/read the data will be started automatically or manually by the user. The access to the application is protected via Username and/or Password and/or PIN or any other authentication method (optional)
- Auto ID code is captured/read by the mobile (optional) device or server (for example in the case an image is taken or the device is not able to read the Auto-ID code directly)
- Amount is displayed on screen (optional)
- Question if amount is OK (optional)
- Question if user wants to proceed (optional)
- Input of an unique Identification Code (Optional), User Name (optional), Password (Optional), MSDN (optional), IMSI (optional), IMEI (optional) MSISDN (optional) Authorization Code (Optional) or PIN (optional), Biometrical Data (optional) or any other Identification Technology or a combination.
- Mobile (optional) device initiates a link with address of server specified by the payment company or a company instructed by the payment company
- The following data is transmitted by the to the mobile (optional) device to the server specified by the payment company or a company instructed by the payment company:
  - ID of cash terminal (optional)
  - Transaction ID (optional) with or without time limitation (time limitation in this terms means that the Transaction ID is only valid for a certain time window)
  - Time Stamp (optional)
  - Amount (optional)
  - Customer ID (like name, customer number, account number, etc) (optional)
  - ID of payment card company (optional) (in case of 1 server/1 address for more than 1 payment card company) (optional)
  - Check digits
  - Other data
- The Data is matched by the server. If it is matching the server will proceed with the payment process (acceptance or rejection
- If the payment is approved, the cash terminal receives a confirmation that the payment is OK. The money is paid out
- The user receives information (via email, SMS, MMS, via the online application on his/her mobile (optional) device or via any other means) that his/her cash transaction has been completed (optional)

Additional Options:
- Option: The information given to the mobile (optional) device is encrypted via any encryption technology like PGP
- Option: The data in the Auto ID code is encrypted (like PGP). The encrypted data is decrypted by the server or by the mobile (optional) device and some parts of this data (all optional) are displayed by the mobile (optional) device.
- Option: The data sent from the mobile (optional) device to the server is encrypted
- Option: The server address in mobile (optional) device is fixed without the opportunity to change for the user (optional)
- Option: The server address, single or multiple in mobile (optional) device is fixed but the user has the choice to select the service (server) he likes to use
- Option: The user has the option to select different services like way of payment (credit/debit or other), bank account (optional)
- Option: The connection is secured via certificates
- Option: The mobile (optional) device reads/captures the data and forwards it to the server without displaying it to the user
- Option: The mobile (optional) device read/capture the data and forward it to the server and partly displays relevant data to the user
- Option: The mobile (optional) device read/capture the data without any execution of the captured/read data, the mobile (device) just forwards the captured/read data to the server
- Option: The mobile (optional) device read/capture the data with a partly execution of the captured/read data, and forward the data needed to the server
- Option: The data from the mobile (optional) device to the server will not be sent via the public internet. It will be sent via a closed user group, terminated within the mobile operators' network or any other way not using the public internet.
- Option: The mobile (optional) device connects to the server either via an online or an offline connection. An offline connection for example is a connection via SMS, MMS, E-Mail or any other voice or data service.

Option: A Proxy Server is used for example at Operator side. The Proxy server passes the data to the main server. Optional the proxy server might add additional information like MSDN, IMEI or MSISDN or IMSI, or other.

Option: The connection and/or the user authentication is secured via certificates and/or existing technologies like PEAP or other Option: The identification of the user to the server can be done via a unique ID, a username, password, IMEI or MSISDN or IMSI or MSDN, IMSI or a combination of each.

Option: The Payee has to be authorized at the payment server

Option: The connection between the buying party and the authorization server (for example payment server) is secured via encryption like VPN and/or any possible authentication technology Option: The Server send payment related data to the selling party Option: The Server sends payment related data to the buying party Option: The Server sends Account related data to the selling party Option: The Server sends Account related data to the buying party Option: The Server sends any other data to the buying and/or the selling party Option: The Server validates the selling party Option: The Server validates the buying party Option: The Server validates the transaction fully or partly Option: The selling party generates the Auto-ID Code Option: The server or any other institution generates the Auto-ID code and send it to the selling party Definitions Auto-ID code: An Auto-ID code is any kind of data formatted, machine readable and described in the specific Auto-ID specification like it is for example for the QR-Code in the ISO Standard.

Auto-ID: Auto-ID is the technology to exchange data in an easy and convenient way via wireless, scanning, image capturing, NFC or any other technology in this area Payment Company Companies like Visa, Master Card, EC Card, PayPal, banks or any other company dealing with money or money transfers Capturing/Reading: Data Capturing/Reading in this terms is for example that an QR Code displayed by the selling party is photographed via the camera of a mobile phone and translated into data via a QR Code reading software Application 3. Auto ID Receipt Payment (for Auto ID Payment in Restaurants, Stores, POS Payments, Gas Stations, etc)

In this application the mobile (optional) device and mobile (optional) POS send information to the payment company (or a company instructed by the payment company)

Process (this Process can be Aborted Anytime by the User and the Sequence is Variable):

The way of payment is selected (credit card, debit card or others) (optional)

A certified (optional), formatted (optional), unique (optional) Auto ID code is generated and displayed on the displaying media like a screen, a display, a TV, a time table, or a piece of paper Data in the Auto ID code is but not limited to:

ID of mobile (optional) POS (optional), store or selling party/or supplier (optional)

Transaction ID (optional) with or without time limitation (time limitation in this terms means that the Transaction ID is only valid for a certain time window)

Time Stamp (optional)

Amount (optional)

Customer ID (like name, customer number, account number, etc) (optional)

Address of server specified by the payment company and/or a company instructed by the payment company (optional)

ID of payment company (optional) (in case of 1 server/1 address for more than 1 payment company)

Other data (optional)

Check Digits

The application to capture/read the data will be started automatically or manually by the user. The access to the application is protected via Username and/or Password and/or PIN or any other authentication method (optional)

Auto ID code is captured/read by the mobile (optional) device or server (for example in the case an image is taken or the device is not able to read the Auto-ID code directly)

Process confirmation by the user. For example: do you want to buy: list of products? Y/N (optional)

Price and/or amount is displayed on the display media (optional)

Question if amount is OK (optional)

Question if user wants to proceed (optional)

Input of an unique Identification Code (Optional), User Name (optional), Password (Optional), MSDN (optional), IMSI (optional), IMEI (optional) MSISDN (optional) Authorization Code (Optional) or PIN (optional), Biometrical Data (optional) or any other Identification Technology or a combination.

Mobile (optional) device initiates a link with address of server specified by the payment company or a company instructed by the payment company The following data is transmitted by the mobile (optional) device to the server specified by the payment company or a company instructed by the payment company:

ID of mobile (optional) POS (optional), store or selling party/or supplier (optional)

Transaction ID (optional) with or without time limitation (time limitation in this terms means that the Transaction ID is only valid for a certain time window)

Time Stamp (optional)

Price and or amount (optional)

Customer ID (like name, customer number, account number, etc) (optional)

ID of payment company (optional) (in case of 1 server/1 address for more than 1 payment company) (optional)

Other data (optional)

Check digits

The Data is matched by the server. If it is matching the server will proceed with the payment process (acceptance or rejection If the payment is approved, the mobile (optional) POS or store or selling party/or supplier receives a confirmation that the payment is OK.

The user receives information (via email, SMS, MMS, via the online application on his/her mobile (optional) device or via any other means) that his/her payment transaction has been completed (optional)

Additional Options:

Option: The information given to the mobile (optional) device is encrypted via any encryption technology like PGP Option: The data in the Auto ID code is encrypted (like PGP). The encrypted data is decrypted by the server or by the mobile (optional) device and some parts of this data (all optional) are displayed by the mobile (optional) device.

Option: The data sent from the mobile (optional) device to the server is encrypted Option: The server address in mobile (optional) device is fixed without the opportunity to change for the user (optional)

Option: The server address, single or multiple in mobile (optional) device is fixed but the user has the choice to select the service (server) he likes to use Option: The user has the option to select different services like way of payment (credit/debit or other), bank account (optional)

Option: The connection is secured via certificates

Option: The mobile (optional) device reads/captures the data and forwards it to the server without displaying it to the user Option: The mobile (optional) device read/capture the data and forward it to the server and partly displays relevant data to the user Option: The mobile (optional) device read/capture the data without any execution of the captured/read data, the mobile (device) just forwards the captured/read data to the server Option: The mobile (optional) device read/capture the data with a partly execution of the captured/read data, and forward the data needed to the server Option: The data from the mobile (optional) device to the server will not be sent via the public internet. It will be sent via a closed user group, terminated within the mobile operators' network or any other way not using the public internet.

Option: The mobile (optional) device connects to the server either via an online or an offline connection. An offline connection for example is a connection via SMS, MMS, E-Mail or any other voice or data service.

Option: A Proxy Server is used for example at Operator side. The Proxy server passes the data to the main server. Optional the proxy server might add additional information like MSDN, IMEI or MSISDN or IMSI, or other.

Option: The connection and/or the user authentication is secured via certificates and/or existing technologies like PEAP or other Option: The identification of the user to the server can be done via a unique ID, a username, password, MSDN, IMEI or MSISDN or IMSI or a combination of each.

Option: The Payee has to be authorized at the payment server

Option: The connection between the buying party and the authorization server (for example payment server) is secured via encryption like VPN and/or any possible authentication technology Option: The Server send payment related data to the selling party Option: The Server sends payment related data to the buying party Option: The Server sends Account related data to the selling party Option: The Server sends Account related data to the buying party Option: The Server sends any other data to the buying and/or the selling party Option: The Server validates the selling party Option: The Server validates the buying party Option: The Server validates the transaction fully or partly Option: The selling party generates the Auto-ID Code Option: The server or any other institution generates the Auto-ID code and send it to the selling party Definitions Auto-ID code: An Auto-ID code is any kind of data formatted, machine readable and described in the specific Auto-ID specification like it is for example for the QR-Code in the ISO Standard.

Auto-ID Auto-ID is the technology to exchange data in an easy and convenient way via wireless, scanning, image capturing, NFC or any other technology in this area Payment Company Companies like Visa, Master Card, EC Card, PayPal, banks or any other company dealing with money or money transfers Capturing/Reading: Data Capturing/Reading in this terms is for example that an QR Code displayed by the selling party is photographed via the camera of a mobile phone and translated into data via a QR Code reading software Application 4: CNP Applications (Card Not Present Applications), All Applications where the Payment Card is not Present Also in this application the buyer and the selling party send information to the payment company (or a company instructed by the payment company) This might be used (but not limited to) for example for TV shopping where nowadays the buying party calls the selling party and to proceed the selling the buying party has to hand out it's payment details like credit card number. In our case the only sensitive information to hand out is the e-mail address of the buying party. Process (this Process can be Aborted Anytime by the User and the Sequence is Variable):

The customer orders the goods, services via a medium (phone, etc) and gives all the information (optional) except his/her payment details. The buyer only indicates how he wants to pay.

The selling party/supplier of the goods, services or others sends to the buyer and email or other way of communication) which contains information on what the buying party bought (optional), shipping address (optional), billing address (optional), other data (optional) and an Auto ID payment code.

The selling party/supplier sends a request to the customers' payment company. This also can happen sooner in the process.

The buyer decodes the Auto ID code with his/her mobile (optional) device within a time window (optional) and sends this information (or parts of it, or adds information) to his/her payment company (or a company instructed by the payment company)

Data in the Auto ID code is but not limited to:
  ID of selling party/supplier (optional)
  Transaction ID (optional) with or without time limitation (time limitation in this terms means that the Transaction ID is only valid for a certain time window)
  Time Stamp (optional)
  Price and or amount (optional)
  Customer ID (like name, customer number, account number, etc) (optional)
  Address of server specified by the payment company and/or a company instructed by the payment company (optional)
  ID of payment company (optional) (in case of 1 server/1 address for more than 1 payment company)
  Other data (optional)
  Check Digits The application to capture/read the data will be started automatically or manually by the user. The access to the application is protected via Username and/or Password and/or PIN or any other authentication method (optional)

Auto ID code is captured/read by the mobile (optional) device or server (for example in the case an image is taken or the device is not able to read the Auto-ID code directly)

Process confirmation by the user. For example: do you want to buy: list of products? Y/N (optional)

Price and/or amount is displayed on the display media (optional)

Question if amount is OK (optional)

Question if user wants to proceed (optional)

Input of an unique Identification Code (Optional), User Name (optional), Password (Optional), MSDN (optional), IMSI (optional), IMEI (optional) MSISDN (optional) Authorization Code (Optional) or PIN (optional), Biometrical Data (optional) or any other Identification Technology or a combination Mobile (optional) device initiates a link with address of server specified by the payment company or a company instructed by the payment company The following data is transmitted by the mobile (optional) device to the server specified by the payment company or a company instructed by the payment company:

ID of Store (optional)

Transaction ID (optional) with or without time limitation (time limitation in this terms means that the Transaction ID is only valid for a certain time window)

Time Stamp (optional)

Price and or amount (optional)

Customer ID (like name, customer number, account number, etc) (optional)

ID of payment company (optional) (in case of 1 server/1 address for more than 1 payment company) (optional)

Other data (optional)

Check digits

The Data is matched by the server. If it is matching the server will proceed with the payment process (acceptance or rejection If the payment is approved, the store (optional) or the selling party (optional) gets a confirmation that the payment is OK (optional).

The buyer gets information (via email, SMS, MMS, via the online application on his/her mobile (optional) device or via any other means) that buy transaction has been completed (optional)

Additional Options:

Option: The information given to the mobile (optional) device is encrypted via any encryption technology like PGP Option: The data in the Auto ID code is encrypted (like PGP). The encrypted data is decrypted by the server or by the mobile (optional) device and some parts of this data (all optional) are displayed by the mobile (optional) device.

Option: The data sent from the mobile (optional) device to the server is encrypted Option: The server address in mobile (optional) device is fixed without the opportunity to change for the user (optional)

Option: The server address, single or multiple in mobile (optional) device is fixed but the user has the choice to select the service (server) he likes to use Option: The user has the option to select different services like way of payment (credit/debit or other), bank account (optional)

Option: The connection is secured via certificates

Option: The mobile (optional) device reads/captures the data and forwards it to the server without displaying it to the user Option: The mobile (optional) device read/capture the data and forward it to the server and partly displays relevant data to the user Option: The mobile (optional) device read/capture the data without any execution of the captured/read data, the mobile (device) just forwards the captured/read data to the server Option: The mobile (optional) device read/capture the data with a partly execution of the captured/read data, and forward the data needed to the server Option: The data from the mobile (optional) device to the server will not be sent via the public internet. It will be sent via a closed user group, terminated within the mobile operators' network or any other way not using the public internet.

Option: The mobile (optional) device connects to the server either via an online or an offline connection. An offline connection for example is a connection via SMS, MMS, E-Mail or any other voice or data service.

Option: A Proxy Server is used for example at Operator side. The Proxy server passes the data to the main server. Optional the proxy server might add additional information like MSDN, IMEI or MSISDN or IMSI, or other.

Option: The connection and/or the user authentication is secured via certificates and/or existing technologies like PEAP or other Option: The identification of the user to the server can be done via a unique ID, a username, password, MSDN, IMEI, MSISDN, IMSI or a combination of each.

Option: The Payee has to be authorized at the payment server

Option: The connection between the buying party and the authorization server (for example payment server) is secured via encryption like VPN and/or any possible authentication technology Option: The Server send payment related data to the selling party Option: The Server sends payment related data to the buying party Option: The Server sends Account related data to the selling party Option: The Server sends Account related data to the buying party Option: The Server sends any other data to the buying and/or the selling party Option: The Server validates the selling party Option: The Server validates the buying party Option: The Server validates the transaction fully or partly Option: The selling party generates the Auto-ID Code Option: The server or any other institution generates the Auto-ID code and send it to the selling party Definitions Auto-ID code: An Auto-ID code is any kind of data formatted, machine readable and described in the specific Auto-ID specification like it is for example for the QR-Code in the ISO Standard.

Auto-ID Auto-ID is the technology to exchange data in an easy and convenient way via wireless, scanning, image capturing, NFC or any other technology in this area Payment Company: Companies like Visa, Master Card, EC Card, PayPal, banks or any other company dealing with money or money transfers Capturing/Reading: Data Capturing/Reading in this terms is for example that an QR Code displayed by the selling party is photographed via the camera of a mobile phone and translated into data via a QR Code reading software Application 5: Auto ID Mobile to Mobile Payment In this application either the selling mobile (optional) device and buying/taking mobile (optional) device send information to the payment company (or a company instructed by the payment company) or only the buying mobile (optional) device sends information to the payment company (or a company instructed by the payment company). This process might be used for parents giving pocket money to their kids.

Process (this Process can be Aborted Anytime by the User and the Sequence is Variable):

The way of payment is selected (credit card, debit card or others) (optional)

A certified (optional), formatted (optional), unique (optional) Auto ID code is generated and displayed on the displaying media like a screen, a display, a TV, a time table, or a piece of paper Data in the Auto ID code is but not limited to:
  ID of mobile (optional) POS (optional), store or selling party/or supplier (optional)
  Transaction ID (optional) with or without time limitation (time limitation in this terms means that the Transaction ID is only valid for a certain time window)
  Time Stamp (optional)
    Amount (optional)
    Customer ID (like name, customer number, account number, etc) (optional)
    Address of server specified by the payment company and/or a company instructed by the payment company (optional)
    ID of payment company (optional) (in case of 1 server/1 address for more than 1 payment company)
    Other data (optional)
    Check Digits The application to capture/read the data will be started automatically or manually by the user. The access to the application is protected via Username and/or Password and/or PIN or any other authentication method (optional)

Auto ID code is captured/read by the mobile (optional) device or server (for example in the case an image is taken or the device is not able to read the Auto-ID code directly)

Process confirmation by the user. For example: do you want to buy: list of products? Y/N (optional)

Price and/or amount is displayed on the display media (optional)

Question if amount is OK (optional)

Question if user wants to proceed (optional)

Input of an unique Identification Code (Optional), User Name (optional), Password (Optional), MSDN (optional), IMSI (optional), IMEI (optional) or MSISDN (optional), Authorization Code (Optional) or PIN (optional), Biometrical Data (optional) or any other Identification Technology or a combination.

Mobile (optional) device initiates a link with address of server specified by the payment company or a company instructed by the payment company The following data is transmitted by the mobile (optional) device to the server specified by the payment company or a company instructed by the payment company:
  ID of mobile (optional) POS (optional), store or selling party/or supplier (optional)
  Transaction ID (optional) with or without time limitation (time limitation in this terms means that the Transaction ID is only valid for a certain time window)
  Time Stamp (optional)
  Price and or amount (optional)
  Customer ID (like name, customer number, account number, etc) (optional)
  ID of payment company (optional) (in case of 1 server/1 address for more than 1 payment company) (optional)
  Other data (optional)
  Check digits The Data is matched by the server. If it is matching the server will proceed with the payment process (acceptance or rejection If the payment is approved, the mobile (optional) POS or store or selling party/or supplier receives a confirmation that the payment is OK.

If 2 requests have been send and if they match and the payment is approved, the mobile (optional) POS or store or selling party/or supplier receives a confirmation that the payment is OK.

The user receives information (via email, SMS, MMS, via the online application on his/her mobile (optional) device or via any other means) that his/her payment transaction has been completed (optional)

Additional Options:

Option: The information given to the mobile (optional) device is encrypted via any encryption technology like PGP Option: The data in the Auto ID code is encrypted (like PGP). The encrypted data is decrypted by the server or by the mobile (optional) device and some parts of this data (all optional) are displayed by the mobile (optional) device.

Option: The data sent from the mobile (optional) device to the server is encrypted Option: The server address in mobile (optional) device is fixed without the opportunity to change for the user (optional)

Option: The server address, single or multiple in mobile (optional) device is fixed but the user has the choice to select the service (server) he likes to use Option: The user has the option to select different services like way of payment (credit/debit or other), bank account (optional)

Option: The connection is secured via certificates

Option: The mobile (optional) device reads/captures the data and forwards it to the server without displaying it to the user Option: The mobile (optional) device read/capture the data and forward it to the server and partly displays relevant data to the user Option: The mobile (optional) device read/capture the data without any execution of the captured/read data, the mobile (device) just forwards the captured/read data to the server Option: The mobile (optional) device read/capture the data with a partly execution of the captured/read data, and forward the data needed to the server Option: The data from the mobile (optional) device to the server will not be sent via the public internet. It will be sent via a closed user group, terminated within the mobile operators' network or any other way not using the public internet.

Option: The mobile (optional) device connects to the server either via an online or an offline connection. An offline connection for example is a connection via SMS, MMS, E-Mail or any other voice or data service.

Option: A Proxy Server is used for example at Operator side. The Proxy server passes the data to the main server. Optional the proxy server might add additional information like MSDN, IMEI (optional) MSISDN (optional) IMSI, or other.

Option: The connection and/or the user authentication is secured via certificates and/or existing technologies like PEAP or other Option: The identification of the user to the server can be done via a unique ID, a username, password, MSDN, IMEI MSISDN, IMSI or a combination of each.

Option: The Payee has to be authorized at the payment server

Option: The connection between the buying party and the authorization server (for example payment server) is secured via encryption like VPN and/or any possible authentication technology Option: The Server send payment related data to the selling party Option: The Server sends payment related data to the buying party Option: The Server sends Account related data to the selling party Option: The Server sends Account related data to the buying party Option: The Server sends any other data to the buying and/or the selling party Option: The Server validates the selling party Option: The Server validates the buying party Option: The Server validates the transaction fully or partly Option: The selling party generates the Auto-ID Code Option: The server or any other institution generates the Auto-ID code and send it to the selling party Definitions Auto-ID code: An Auto-ID code is any kind of data formatted, machine readable and described in the specific Auto-ID specification like it is for example for the QR-Code in the ISO Standard.

Auto-ID: Auto-ID is the technology to exchange data in an easy and convenient way via wireless, scanning, image capturing, NFC or any other technology in this area Payment Company Companies like Visa, Master Card, EC Card, PayPal, banks or any other company dealing with money or money transfers Capturing/Reading: Data Capturing/Reading in this terms is for example that an QR Code displayed by the selling party is photographed via the camera of a mobile phone and translated into data via a QR Code reading software Application 6: Authorization Applications Also in this application the person who wants to access the web service (s) and the web service server (or online portal in case of access to multiple web services) send information to the authorization server Process (this Process can be Aborted Anytime by the User and the Sequence is Variable):

A user wants to access a web service.

This user log in with his initial login credentials.

A certified (optional), formatted (optional), unique (optional) Auto ID code is generated and displayed on the displaying media like a screen, a display, a TV, a time table, or a piece of paper The user decodes the Auto ID code with his/her mobile (optional) device within a time window (optional) and sends this information (or parts of it, or adds information) to the authorization server. Alternatively the Auto-ID code can be read by the user and put in manually into the (mobile) device.

Data in the Auto ID code is but not limited to:
ID of the web service or online portal (optional)
Transaction ID (optional) with or without time limitation (time limitation in this terms means that the Transaction ID is only valid for a certain time window)
Time Stamp (optional)
User ID (like name, customer number, account number, etc) (optional)
Address of server specified by the authorization server (optional)
ID of authorization server (optional)
Other data (optional)
Check Digits The application to capture/read the data will be started automatically or manually by the user. The access to the application is protected via Username and/or Password and/or PIN or any other authentication method (optional)

Auto ID code is captured/read by the mobile (optional) device or server (for example in the case an image is taken or the device is not able to read the Auto-ID code directly)

Process confirmation by the user. For example: do you want to access the service: Y/N (optional)
Question if user wants to proceed (optional)
Input of an unique Identification Code (Optional), User Name (optional), Password (Optional), MSDN (optional), IMSI (optional), IMEI (optional) MSISDN (optional) Authorization Code (Optional) or PIN (optional), Biometrical Data (optional) or any other Identification Technology or a combination.

Mobile (optional) device initiates a link with address of server specified by the authorization server The following data is transmitted by the mobile (optional) device to the authorization server
ID of web service or online portal (optional)
Transaction ID (optional) with or without time limitation (time limitation in this terms means that the Transaction ID is only valid for a certain time window)
Time Stamp (optional)
User ID (like name, customer number, account number, etc) (optional)
ID of authorization server (optional)
Other data (optional)
Check digits The data is matched by the server. If it is matching the server will proceed with the access process (acceptance or rejection If the access is approved, the user can continue with the service Additional Options:

Option: The information given to the mobile (optional) device is encrypted via any encryption technology like PGP Option: The data in the Auto ID code is encrypted (like PGP). The encrypted data is decrypted by the server or by the mobile (optional) device and some parts of this data (all optional) are displayed by the mobile (optional) device.

Option: The data sent from the mobile (optional) device to the server is encrypted Option: The server address in mobile (optional) device is fixed without the opportunity to change for the user (optional)

Option: The server address, single or multiple in mobile (optional) device is fixed but the user has the choice to select the service (server) he likes to use Option: The user has the option to select different services like way of payment (credit/debit or other), bank account (optional)

Option: The connection is secured via certificates

Option: The mobile (optional) device reads/captures the data and forwards it to the server without displaying it to the user Option: The mobile (optional) device read/capture the data and forward it to the server and partly displays relevant data to the user Option: The mobile (optional) device read/capture the data without any execution of the captured/read data, the mobile (device) just forwards the captured/read data to the server Option: The mobile (optional) device read/capture the data with a partly execution of the captured/read data, and forward the data needed to the server Option: The data from the mobile (optional) device to the server will not be sent via the public internet. It will be sent via a closed user group, terminated within the mobile operators' network or any other way not using the public internet.

Option: The mobile (optional) device connects to the server either via an online or an offline connection. An offline connection for example is a connection via SMS, MMS, E-Mail or any other voice or data service.

Option: A Proxy Server is used for example at Operator side. The Proxy server passes the data to the main server. Optional the proxy server might add additional information like MSDN, IMEI MSISD/IMSI, or other.

Option: The connection and/or the user authentication is secured via certificates and/or existing technologies like PEAP or other Option: The identification of the user to the server can be done via a unique ID, a username, password, IMEI MSISDN, IMSI or a combination of each.

Option: The connection between the buying party and the authorization server (for example payment server) is secured via encryption like VPN and/or any possible authentication technology Option: The Server send payment related data to the selling party Option: The Server sends payment related data to the buying party Option: The Server sends Account related data to the selling party Option: The Server sends Account related data to the buying party Option: The Server sends any other data to the buying and/or the selling party Option: The Server validates the selling party Option: The Server validates the buying party Option: The Server validates the transaction fully or partly Option: The selling party generates the Auto-ID Code Option: The server or any other institution generates the Auto-ID code and send it to the selling party Definitions Auto-ID code: An Auto-ID code is any kind of data formatted, machine readable and described in the specific Auto-ID specification like it is for example for the QR-Code in the ISO Standard.

Auto-ID: Auto-ID is the technology to exchange data in an easy and convenient way via wireless, scanning, image capturing, NFC or any other technology in this area.

Web services All services where login credentials are needed to access the service.

Figure 13:
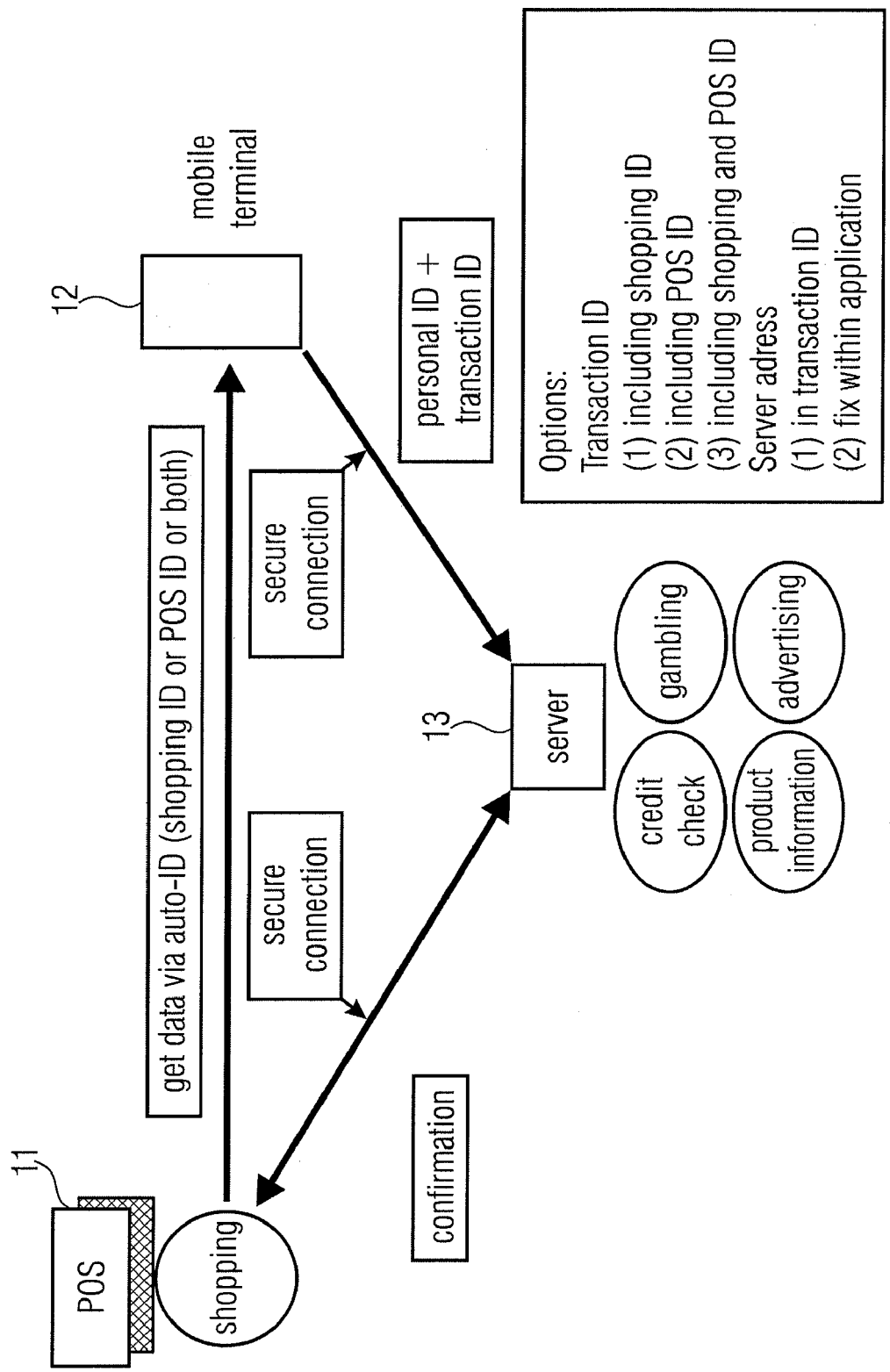
FIG. 13 illustrates several applications of the inventive concept.

Capturing/Reading: Data Capturing/Reading in this terms is for example that an QR Code displayed by the selling party is photographed via the camera of a mobile phone and translated into data via a QR Code reading software Further embodiments are described with respect to FIG. 13.

The target is to provide value added services for the mobile phone like payment, gambling, advertisement or other future services.

The data provided via Auto-ID Technology like QR Codes will be captured by the mobile phone for example via the camera. When the data is captured the data will be transferred to a dedicated server which is configured within the reading application and a browser will be opened. Advantageously, neither the user nor the Auto-ID Technology is able to change the address of this server.

The server verifies the data and the action given with the QR-Code data (or any other Auto-ID Technology) will be performed like payment, advertisement, gambling, music download etc.

Useful for this Service is the Personal ID

Personal ID is a Unique Identification

1. At the Point of Sales a Shopping ID is created
2. Shopping ID will be read via the mobile terminal
3. Mobile terminal adds it's personal ID to the Shopping ID
4. Personal ID and Shopping ID are sent to a server via a secure connection
5. The Server will validate the data
6. The Server will perform the given action like payment check
7. The Server will send the result of the payment checking to the POS or give information to the mobile Terminal
8. For payment, POS finishes the payment and hands out the goods The described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

Depending on certain implementation requirements of the inventive methods, the inventive methods can be implemented in hardware or in software. The implementation can be performed using a digital storage medium, in particular, a disc, a DVD or a CD having electronically-readable control signals stored thereon, which co-operate with programmable computer systems such that the inventive methods are performed. Generally, the present invention is therefore a computer program product with a program code stored on a machine-readable carrier, the program code being operated for performing the inventive methods when the computer program product runs on a computer. In other words, the inventive methods are, therefore, a computer program having a program code for performing at least one of the inventive methods when the computer program runs on a computer.

The invention claimed is:

1. A server device for controlling a transaction between the first entity and the second entity, comprising:
   a receiver for receiving a first message from the first entity, the first message comprising first information related to the transaction, and a second message from the second entity, the second message comprising second information related to the transaction;
   a matcher for checking whether the first information in the first message and the second information in the second message comprise a predetermined relation to each other; and
   an output interface for authorizing the transaction, when the first information and the second information comprise a predetermined relation and for rejecting the transaction, when the first information and the second information do not comprise the predetermined relation to each other, wherein the matcher is adapted to perform a check whether a time difference between a reception or generation of the first message and a reception or generation of the second message or a time difference between a generation of an identification code in the first entity and a transmission or reception of the first message or the second message is greater than a predetermined amount of time or not, wherein the output interface is operative to reject a transaction, when the predetermined amount of time is exceeded, wherein each of the first message and the second message comprises a time stamp indicating a generation or a transmission time, and wherein the matcher is operative to perform the check based on the time stamps of the first message and the second message, or wherein the second message comprises a time code generated by the first entity, and wherein the matcher is operative to perform the check by comparing the time code generated by the first entity to a reception time of the second message.

2. The server device in accordance with claim 1, in which the transaction information comprises a transaction ID uniquely referencing a transaction record comprising further information on the transaction, and in which the matcher is operative to determine whether a message from the first entity and the message from the second entity comprising matching transaction IDs have been received by the receiver.

3. The server device in accordance with claim 1, in which the transaction is a payment transaction or a cash redraw transaction, and the output interface is operative to initiate the communication to a payment or a cash providing institute only when the transaction has been authorized.

4. The server device in accordance with claim 1, in which the transaction is an access to a data service of the first entity, and in which the output interface is operative to only authorize the transaction by sending an authorization message to the first entity.

5. Server device in accordance with claim 1, wherein the second message is derived from an optical, radio, touch, contactless or active ID code.

6. A method, performed in a server device, for controlling a transaction between the first entity and the second entity, comprising:

receiving, by a receiver, a first message from the first entity, the first message comprising first information related to the transaction, and a second message from the second entity, the second message comprising second information related to the transaction;

checking, by a matcher, whether the first information in the first message and the second information in the second message comprise a predetermined relation to each other; and authorizing, by an output interface, the transaction, when the first information and the second information comprise a predetermined relation and for rejecting the transaction, when the first information and the second information do not comprise the predetermined relation to each other, wherein, in checking, a check is performed, whether a time difference between a reception or generation of the first message and a reception or generation of the second message or a time difference between a generation of an identification code in the first entity and a transmission or reception of the first message or the second message is greater than a predetermined amount of time or not, wherein a transaction is rejected, when the predetermined amount of time is exceeded, wherein each of the first message and the second message comprises a time stamp indicating a generation or a transmission time, and wherein the check is performed based on the time stamps of the first message and the second message, or wherein the second message comprises a time code generated by the first entity, and wherein the check is performed by comparing the time code generated by the first entity to a reception time of the second message, wherein at least one of the receiver, the matcher and the output interface comprises a hardware implementation.

7. A non-transitory storage medium having stored thereon a computer program for performing, when running on a computer, a method, performed in a server device, for controlling a transaction between the first entity and the second entity, the method comprising: receiving a first message from the first entity, the first message comprising first information related to the transaction, and a second message from the second entity, the second message comprising second information related to the transaction; checking whether the first information in the first message and the second information in the second message comprise a predetermined relation to each other; and authorizing the transaction, when the first information and the second information comprise a predetermined relation and for rejecting the transaction, when the first information and the second information do not comprise the predetermined relation to each other, wherein, in checking, a check is performed, whether a time difference between a reception or generation of the first message and a reception or generation of the second message or a time difference between a generation of an identification code in the first entity and a transmission or reception of the first message or the second message is greater than a predetermined amount of time or not, wherein a transaction is rejected, when the predetermined amount of time is exceeded, wherein each of the first message and the second message comprises a time stamp indicating a generation or a transmission time, and wherein the check is performed based on the time stamps of the first message and the second message, or wherein the second message comprises a time code generated by the first entity, and wherein the check is performed by comparing the time code generated by the first entity to a reception time of the second message.

* * * * *

UNITED STATES PATENT AND TRADEMARK OFFICE
CERTIFICATE OF CORRECTION

| | | |
|---|---|---|
| PATENT NO. | : 8,332,323 B2 | Page 1 of 1 |
| APPLICATION NO. | : 12/956874 | |
| DATED | : December 11, 2012 | |
| INVENTOR(S) | : Luc Stals et al. | |

It is certified that error appears in the above-identified patent and that said Letters Patent is hereby corrected as shown below:

On the Title Page, Item (73) Assignee:

Mr. QR10 GmbH & Co. Kg.

should be:

MR. QR10 GMBH & CO. KG.

Signed and Sealed this
Twenty-fifth Day of November, 2014

Michelle K. Lee
*Deputy Director of the United States Patent and Trademark Office*